(12) United States Patent
Martín Antonio et al.

(10) Patent No.: US 12,509,525 B2
(45) Date of Patent: Dec. 30, 2025

(54) CAR T-CELLS AGAINST BCMA FOR THE TREATMENT OF MULTIPLE MYELOMA

(71) Applicants: Fundació de Recerca Clínic Barcelona-Institut d'Investigacions Biomèdiques August Pi i Sunyer, Barcelona (ES); HOSPITAL CLINIC DE BARCELONA, Barcelona (ES); UNIVERSITAT DE BARCELONA, Barcelona (ES)

(72) Inventors: Beatriz Martín Antonio, Barcelona (ES); Álvaro Urbano Ispizua, Barcelona (ES); Lorena Pérez Amill, Barcelona (ES); Guillermo Suñe Rodriguez, Barcelona (ES); Manel Juan Otero, Barcelona (ES)

(73) Assignees: FUNDACIÓ DE RECERCA CIÍNIC BARCELONA-INSTITUT D'INVESTIGACIONS BIOMÈDIQUES AUGUST PI I SUNYER, Barcelona (ES); HOSPITAL CLINIC DE BARCELONA, Barcelona (ES); UNIVERSITAT DE BARCELONA, Barcelona (ES)

(*) Notice: Subject to any disclaimer, the term of this patent is extended or adjusted under 35 U.S.C. 154(b) by 839 days.

(21) Appl. No.: 17/632,191

(22) PCT Filed: Aug. 3, 2020

(86) PCT No.: PCT/EP2020/071831
§ 371 (c)(1),
(2) Date: Feb. 1, 2022

(87) PCT Pub. No.: WO2021/023721
PCT Pub. Date: Feb. 11, 2021

(65) Prior Publication Data
US 2022/0267459 A1    Aug. 25, 2022

(30) Foreign Application Priority Data

Aug. 2, 2019    (EP) .................................... 19382673

(51) Int. Cl.
C07K 16/28     (2006.01)
A61K 40/11     (2025.01)
(Continued)

(52) U.S. Cl.
CPC .......... C07K 16/2878 (2013.01); A61K 40/11 (2025.01); A61K 40/31 (2025.01);
(Continued)

(58) Field of Classification Search
CPC ........................ C07K 16/2875; A61K 40/4215
See application file for complete search history.

(56) References Cited

U.S. PATENT DOCUMENTS

| | | | |
|---|---|---|---|
| 11,053,549 B2 | 7/2021 | Barrachina Castillo et al. | |
| 2015/0284467 A1* | 10/2015 | Lipp ...................... | A61P 35/00 424/139.1 |

(Continued)

FOREIGN PATENT DOCUMENTS

| | | | |
|---|---|---|---|
| CN | 108004259 A | 5/2018 | |
| CN | 108285489 A | 7/2018 | |
| CN | 108395478 A | 8/2018 | |
| WO | WO-2017211900 A1 * | 12/2017 | ............. A61K 35/17 |

OTHER PUBLICATIONS

Chailyan A, Marcatili P, Tramontano A. The association of heavy and light chain variable domains in antibodies: implications for antigen specificity. FEBS J. Aug. 2011;278(16):2858-66. doi: 10.1111/j.1742-4658.2011.08207.x. Epub Jun. 28, 2011. PMID: 21651726; PMCID: PMC3562479. (Year: 2011).*

(Continued)

*Primary Examiner* — Sue X Liu
(74) *Attorney, Agent, or Firm* — Seed Intellectual Property Law Group LLP

(57) ABSTRACT

The present invention provides therapeutics for the treatment of Multiple myeloma. In particular, the present invention provides chimeric antigen receptor (CAR) T-cells that can target the B cell maturation antigen.

17 Claims, 6 Drawing Sheets

Specification includes a Sequence Listing.

(51) Int. Cl.
  *A61K 40/31* (2025.01)
  *A61K 40/42* (2025.01)
  *A61P 35/00* (2006.01)
  *C07K 14/705* (2006.01)
  *C07K 14/725* (2006.01)

(52) U.S. Cl.
  CPC .......... *A61K 40/4215* (2025.01); *A61P 35/00* (2018.01); *C07K 14/7051* (2013.01); *C07K 14/70517* (2013.01); *C07K 14/70578* (2013.01); *A61K 2239/46* (2023.05); *C07K 2317/24* (2013.01); *C07K 2317/53* (2013.01); *C07K 2317/622* (2013.01); *C07K 2319/03* (2013.01)

(56) References Cited

U.S. PATENT DOCUMENTS

| | | | |
|---|---|---|---|
| 2018/0325955 A1* | 11/2018 | Terrett | C12N 15/62 |
| 2018/0346996 A1 | 12/2018 | Cos et al. | |
| 2018/0355439 A1 | 12/2018 | Cos et al. | |
| 2021/0023162 A1 | 1/2021 | Lozano Soto et al. | |
| 2022/0049307 A1 | 2/2022 | Barrachina Castillo et al. | |

OTHER PUBLICATIONS

Ali et al., "T cells expressing an anti-B-cell maturation antigen chimeric antigen receptor cause remissions of multiple myeloma," *Blood* 128(13):1688-1700, Jul. 13, 2016.

Carpenter et al., "B-cell Maturation Antigen is a Promising Target for Adoptive T-cell Therapy of Multiple Myeloma," *Clin Cancer Res.* 19(8):2048-2060, Apr. 5, 2013.

Castella et al., "Development of a Novel Anti-CD19 Chimeric Antigen Receptor: A Paradigm for an Affordable CAR T Cell Production at Academic Institutions," *Molecular Therapy: Methods & Clinical Development* 12:134-144, Mar. 2019.

Cohen et al., "B cell maturation antigen-specific CAR T cells are clinically active in multiple myeloma," *The Journal of Clinical Investigation* 129(6):2210-2221, Jun. 2019.

Martinez et al., "CAR T Cells for Solid Tumors: New Strategies for Finding, Infiltrating, and Surviving in the Tumor Microenvironment," *Frontiers in Immunology* 10(128), Feb. 5, 2019. (21 pages).

Raje et al., "Anti-BCMA CAR T-Cell Therapy bb2121 in Relapsed or Refractory Multiple Myeloma," *N Engl J Med.* 380(18):1726-1737, May 2, 2019.

Sommermeyer et al., "Fully human CD19-specific chimeric antigen receptors for T-cell therapy," *Leukemia* 31(10):2191-2199, Oct. 2017.

Turtle et al., "CD19 CAR-T cells of defined CD4+:CD8+ composition in adult B cell ALL patients," *The Journal of Clinical Investigation* 126(6):2123-2138, Jun. 2016.

Zhao et al., "A phase 1, open-label study of LCAR-B38M, a chimeric antigen receptor T cell therapy directed against B cell maturation antigen, in patients with relapsed or refractory multiple myeloma," *Journal of Hematology & Oncology* 11(141), 2018. (8 pages).

Bluhm et al., "CAR T Cells with Enhanced Sensitivity to B Cell Maturation Antigen for the Targeting of B Cell Non-Hodgkin's Lymphoma and Multiple Myeloma," Molecular Therapy 26(8):1906-1920, Aug. 2018. (15 pages).

* cited by examiner

SEQUENCE LISTING

<160> NUMBER OF SEQ ID NOS: 16

<210> SEQ ID NO 1
<211> LENGTH: 120
<212> TYPE: PRT
<213> ORGANISM: Artificial Sequence
<220> FEATURE:
<221> NAME/KEY: PEPTIDE
<222> LOCATION: 1..120
<220> FEATURE:
<223> OTHER INFORMATION: VH domain

<400> SEQUENCE: 1

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Ile Asp Phe Ser Arg Tyr
            20                  25                  30

Trp Met Ser Trp Val Arg Gln Ala Pro Gly Lys Gly Leu Glu Trp Ile
        35                  40                  45

Gly Glu Ile Asn Pro Asp Ser Ser Thr Ile Asn Tyr Ala Pro Ser Leu
    50                  55                  60

Lys Asp Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Ser Leu Tyr Tyr Asp Tyr Gly Asp Ala Met Asp Tyr Trp Gly Gln
            100                 105                 110
```

```
Gly Thr Leu Val Thr Val Ser Ser
            115                 120

<210> SEQ ID NO 2
<211> LENGTH: 107
<212> TYPE: PRT
<213> ORGANISM: Artificial Sequence
<220> FEATURE:
<221> NAME/KEY: PEPTIDE
<222> LOCATION: 1..107
<220> FEATURE:
<223> OTHER INFORMATION: VL domain

<400> SEQUENCE: 2

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Ser Val Asp Ser Asn
            20                  25                  30

Val Ala Trp Tyr Gln Gln Lys Pro Gly Lys Ala Pro Lys Ala Leu Ile
        35                  40                  45

Phe Ser Ala Ser Leu Arg Phe Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Asn Asn Tyr Pro Leu
                85                  90                  95

Thr Phe Gly Gly Gly Thr Lys Val Glu Ile Lys
            100                 105

<210> SEQ ID NO 3
<211> LENGTH: 242
<212> TYPE: PRT
<213> ORGANISM: Artificial Sequence
<220> FEATURE:
<221> NAME/KEY: PEPTIDE
<222> LOCATION: 1..242
<220> FEATURE:
<223> OTHER INFORMATION: VL and VH domain

<400> SEQUENCE: 3

Glu Val Gln Leu Val Glu Ser Gly Gly Gly Leu Val Gln Pro Gly Gly
1               5                   10                  15

Ser Leu Arg Leu Ser Cys Ala Ala Ser Gly Ile Asp Phe Ser Arg Tyr
            20                  25                  30

Trp Met Ser Trp Val Arg Gln Ala Pro Gly Lys Gly Leu Glu Trp Ile
        35                  40                  45

Gly Glu Ile Asn Pro Asp Ser Ser Thr Ile Asn Tyr Ala Pro Ser Leu
    50                  55                  60

Lys Asp Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Ser Leu Tyr Tyr Asp Tyr Gly Asp Ala Met Asp Tyr Trp Gly Gln
            100                 105                 110

Gly Thr Leu Val Thr Val Ser Ser Gly Gly Gly Ser Gly Gly Gly
        115                 120                 125

Gly Ser Gly Gly Gly Gly Ser Asp Ile Gln Met Thr Gln Ser Pro Ser
    130                 135                 140

Ser Leu Ser Ala Ser Val Gly Asp Arg Val Thr Ile Thr Cys Lys Ala
145                 150                 155                 160
```

```
Ser Gln Ser Val Asp Ser Asn Val Ala Trp Tyr Gln Lys Pro Gly
            165                 170                 175

Lys Ala Pro Lys Ala Leu Ile Phe Ser Ala Ser Leu Arg Phe Ser Gly
            180                 185                 190

Val Pro Ser Arg Phe Ser Gly Ser Gly Ser Gly Thr Asp Phe Thr Leu
            195                 200                 205

Thr Ile Ser Ser Leu Gln Pro Glu Asp Phe Ala Thr Tyr Tyr Cys Gln
            210                 215                 220

Gln Tyr Asn Asn Tyr Pro Leu Thr Phe Gly Gly Gly Thr Lys Val Glu
225                 230                 235                 240

Ile Lys

<210> SEQ ID NO 4
<211> LENGTH: 15
<212> TYPE: PRT
<213> ORGANISM: Artificial Sequence
<220> FEATURE:
<221> NAME/KEY: PEPTIDE
<222> LOCATION: 1..15
<220> FEATURE:
<223> OTHER INFORMATION: Linker

<400> SEQUENCE: 4

Gly Gly Gly Gly Ser Gly Gly Gly Gly Ser Gly Gly Gly Gly Ser
1               5                   10                  15

<210> SEQ ID NO 5
<211> LENGTH: 20
<212> TYPE: PRT
<213> ORGANISM: Artificial Sequence
<220> FEATURE:
<221> NAME/KEY: PEPTIDE
<222> LOCATION: 1..20
<220> FEATURE:
<223> OTHER INFORMATION: signal peptide

<400> SEQUENCE: 5

Met Glu Ala Pro Ala Gln Leu Leu Phe Leu Leu Leu Leu Trp Leu Pro
1               5                   10                  15

Asp Thr Thr Gly
            20

<210> SEQ ID NO 6
<211> LENGTH: 262
<212> TYPE: PRT
<213> ORGANISM: Artificial Sequence
<220> FEATURE:
<221> NAME/KEY: PEPTIDE
<222> LOCATION: 1..262
<220> FEATURE:
<223> OTHER INFORMATION: BCMA-targeting moiety

<400> SEQUENCE: 6

Met Glu Ala Pro Ala Gln Leu Leu Phe Leu Leu Leu Leu Trp Leu Pro
1               5                   10                  15

Asp Thr Thr Gly Glu Val Gln Leu Val Glu Ser Gly Gly Gly Leu Val
            20                  25                  30

Gln Pro Gly Gly Ser Leu Arg Leu Ser Cys Ala Ala Ser Gly Ile Asp
            35                  40                  45

Phe Ser Arg Tyr Trp Met Ser Trp Val Arg Gln Ala Pro Gly Lys Gly
        50                  55                  60

Leu Glu Trp Ile Gly Glu Ile Asn Pro Asp Ser Ser Thr Ile Asn Tyr
```

```
                65                  70                  75                  80
Ala Pro Ser Leu Lys Asp Arg Phe Thr Ile Ser Arg Asp Asn Ala Lys
                    85                  90                  95

Asn Ser Leu Tyr Leu Gln Met Asn Ser Leu Arg Ala Glu Asp Thr Ala
                100                 105                 110

Val Tyr Tyr Cys Ala Ser Leu Tyr Asp Tyr Gly Asp Ala Met Asp
                115                 120                 125

Tyr Trp Gly Gln Gly Thr Leu Val Thr Val Ser Ser Gly Gly Gly
            130                 135                 140

Ser Gly Gly Gly Ser Gly Gly Gly Ser Asp Ile Gln Met Thr
145                 150                 155                 160

Gln Ser Pro Ser Ser Leu Ser Ala Ser Val Gly Asp Arg Val Thr Ile
                    165                 170                 175

Thr Cys Lys Ala Ser Gln Ser Val Asp Ser Asn Val Ala Trp Tyr Gln
                180                 185                 190

Gln Lys Pro Gly Lys Ala Pro Lys Ala Leu Ile Phe Ser Ala Ser Leu
                195                 200                 205

Arg Phe Ser Gly Val Pro Ser Arg Phe Ser Gly Ser Gly Ser Gly Thr
        210                 215                 220

Asp Phe Thr Leu Thr Ile Ser Ser Leu Gln Pro Glu Asp Phe Ala Thr
225                 230                 235                 240

Tyr Tyr Cys Gln Gln Tyr Asn Asn Tyr Pro Leu Thr Phe Gly Gly Gly
                245                 250                 255

Thr Lys Val Glu Ile Lys
            260

<210> SEQ ID NO 7
<211> LENGTH: 23
<212> TYPE: PRT
<213> ORGANISM: Artificial Sequence
<220> FEATURE:
<221> NAME/KEY: PEPTIDE
<222> LOCATION: 1..23
<220> FEATURE:
<223> OTHER INFORMATION: Transmembrane domain derived from CD8a

<400> SEQUENCE: 7

Tyr Ile Trp Ala Pro Leu Ala Gly Thr Cys Gly Val Leu Leu Leu Ser
1               5                   10                  15

Leu Val Ile Thr Leu Tyr Cys
            20

<210> SEQ ID NO 8
<211> LENGTH: 46
<212> TYPE: PRT
<213> ORGANISM: Artificial Sequence
<220> FEATURE:
<221> NAME/KEY: PEPTIDE
<222> LOCATION: 1..46
<220> FEATURE:
<223> OTHER INFORMATION: Hinge domain

<400> SEQUENCE: 8

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
                20                  25                  30

Gly Ala Val His Thr Arg Gly Leu Asp Phe Ala Cys Asp Ile
            35                  40                  45
```

-continued

<210> SEQ ID NO 9
<211> LENGTH: 69
<212> TYPE: PRT
<213> ORGANISM: Artificial Sequence
<220> FEATURE:
<221> NAME/KEY: PEPTIDE
<222> LOCATION: 1..69
<220> FEATURE:
<223> OTHER INFORMATION: transmembrane domain further comprises a CD8
      hinge

<400> SEQUENCE: 9

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp Ile Tyr Ile
        35                  40                  45

Trp Ala Pro Leu Ala Gly Thr Cys Gly Val Leu Leu Leu Ser Leu Val
    50                  55                  60

Ile Thr Leu Tyr Cys
65

<210> SEQ ID NO 10
<211> LENGTH: 113
<212> TYPE: PRT
<213> ORGANISM: Artificial Sequence
<220> FEATURE:
<221> NAME/KEY: PEPTIDE
<222> LOCATION: 1..113
<220> FEATURE:
<223> OTHER INFORMATION: Intracellular signaling domain

<400> SEQUENCE: 10

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg

<210> SEQ ID NO 11
<211> LENGTH: 42
<212> TYPE: PRT
<213> ORGANISM: Artificial Sequence
<220> FEATURE:
<221> NAME/KEY: PEPTIDE
<222> LOCATION: 1..42
<220> FEATURE:
<223> OTHER INFORMATION: costimulatory signaling domain

<400> SEQUENCE: 11

Lys Arg Gly Arg Lys Lys Leu Leu Tyr Ile Phe Lys Gln Pro Phe Met

```
1               5                   10                  15
Arg Pro Val Gln Thr Thr Gln Glu Glu Asp Gly Cys Ser Cys Arg Phe
                20                  25                  30

Pro Glu Glu Glu Glu Gly Gly Cys Glu Leu
        35                  40
```

<210> SEQ ID NO 12
<211> LENGTH: 1460
<212> TYPE: DNA
<213> ORGANISM: Artificial Sequence
<220> FEATURE:
<223> OTHER INFORMATION: full nucleotide sequence of the CAR
<220> FEATURE:
<221> NAME/KEY: misc_feature
<222> LOCATION: 1..1460

<400> SEQUENCE: 12

```
atggaggctc cagcacagct cctttttctg ctcctcctgt ggctccctga tacgaccgga      60
gaagttcaac tcgtggagag cggtggggga ctcgtacagc caggtggatc tctcagactt     120
tcctgcgctg catcaggcat agactttagt cggtactgga tgagttgggt acgacaagct     180
cctgggaagg gcttggaatg gattggtgaa atcaacccgg acagcagcac cataaattat     240
gctccaagct tgaaagaccg gttcactata tctcgggata tgctaaaaa ctcccttttac     300 cttcagatga atagtctccg ggcggaagat acggcggtgt attactgtgc ttctctgtac     360
tacgactatg gcgatgcaat ggactattgg ggccaaggta cgctggtgac cgtctcatct     420 gggggggga gtagtggagg aggaggttca gggggggcg aagtgatat tcaaatgaca     480 cagtctccgt cttcactgag tgcttctgta ggggatcgag ttacgatcac ttgtaaggcc     540
agccaatccg tggattctaa tgttgcgtgg tatcagcaga agcccggcaa agcgcctaaa     600
gcactgatat ttagcgcatc actccgcttt tccggggtcc cctccaggtt cagtggtagc     660
gggtctggaa cagacttcac tctcactata tcttcattgc aaccagaaga cttcgcgacc     720
tattactgtc agcaatacaa taactacccg cttacgttcg gcggcggcac taaagtcgaa     780
atcaagacga cgacgccggc gccgagacca cctacacctg caccaactat tgcctctcag     840
ccactgagtc tgcgccccga ggcatgtcga cctgccgctg gcggggctgt gcacaccagg     900
ggcctagact cgcctgcga tatctatatt tgggctccac tggcaggaac ctgtggcgtg     960
ctgctgctgt ctctggtcat cacactgtac tgcaaaagag caggaagaa actgctgtat    1020 attttcaagc agcccttat gagacctgtg cagacaactc aggaggaaga cgggtgcagc    1080
tgtaggttcc ctgaggaaga ggaaggaggc tgtgagctgc gcgtgaaatt ttctcggagt    1140
gcagatgccc cagcttacca gcagggccag aaccagctgt ataacgagct gaatctgggg    1200
cggagagagg aatacgacgt gctggataag aggcgcgggc gagatccaga aatggggaga    1260
aaaccccagc gacggaagaa ccctcaggag ggactgtaca atgaactgca aaggacaaa    1320 atggcagagg cctattccga aatcgggatg aaggagaaa gaaggcgcgg caaggggcat    1380
gatggcctgt atcagggact gtcaaccgca acaaaagata cttatgatgc tctgcacatg    1440
caggctctgc ccccgcggta                                                1460
```

<210> SEQ ID NO 13
<211> LENGTH: 486
<212> TYPE: PRT
<213> ORGANISM: Artificial Sequence
<220> FEATURE:
<221> NAME/KEY: PEPTIDE
<222> LOCATION: 1..486

<220> FEATURE:
<223> OTHER INFORMATION: full amino acid sequence of the CAR

<400> SEQUENCE: 13

```
Met Glu Ala Pro Ala Gln Leu Leu Phe Leu Leu Leu Leu Trp Leu Pro
1               5                   10                  15

Asp Thr Thr Gly Glu Val Gln Leu Val Glu Ser Gly Gly Gly Leu Val
            20                  25                  30

Gln Pro Gly Gly Ser Leu Arg Leu Ser Cys Ala Ala Ser Gly Ile Asp
        35                  40                  45

Phe Ser Arg Tyr Trp Met Ser Trp Val Arg Gln Ala Pro Gly Lys Gly
    50                  55                  60

Leu Glu Trp Ile Gly Glu Ile Asn Pro Asp Ser Ser Thr Ile Asn Tyr
65                  70                  75                  80

Ala Pro Ser Leu Lys Asp Arg Phe Thr Ile Ser Arg Asp Asn Ala Lys
                85                  90                  95

Asn Ser Leu Tyr Leu Gln Met Asn Ser Leu Arg Ala Glu Asp Thr Ala
            100                 105                 110

Val Tyr Tyr Cys Ala Ser Leu Tyr Tyr Asp Tyr Gly Asp Ala Met Asp
        115                 120                 125

Tyr Trp Gly Gln Gly Thr Leu Val Thr Val Ser Ser Gly Gly Gly Gly
    130                 135                 140

Ser Gly Gly Gly Gly Ser Gly Gly Gly Gly Ser Asp Ile Gln Met Thr
145                 150                 155                 160

Gln Ser Pro Ser Ser Leu Ser Ala Ser Val Gly Asp Arg Val Thr Ile
                165                 170                 175

Thr Cys Lys Ala Ser Gln Ser Val Asp Ser Asn Val Ala Trp Tyr Gln
            180                 185                 190

Gln Lys Pro Gly Lys Ala Pro Lys Ala Leu Ile Phe Ser Ala Ser Leu
        195                 200                 205

Arg Phe Ser Gly Val Pro Ser Arg Phe Ser Gly Ser Gly Ser Gly Thr
    210                 215                 220

Asp Phe Thr Leu Thr Ile Ser Ser Leu Gln Pro Glu Asp Phe Ala Thr
225                 230                 235                 240

Tyr Tyr Cys Gln Gln Tyr Asn Asn Tyr Pro Leu Thr Phe Gly Gly Gly
                245                 250                 255

Thr Lys Val Glu Ile Lys Thr Thr Thr Pro Ala Pro Arg Pro Pro Thr
            260                 265                 270

Pro Ala Pro Thr Ile Ala Ser Gln Pro Leu Ser Leu Arg Pro Glu Ala
        275                 280                 285

Cys Arg Pro Ala Ala Gly Gly Ala Val His Thr Arg Gly Leu Asp Phe
    290                 295                 300

Ala Cys Asp Ile Tyr Ile Trp Ala Pro Leu Ala Gly Thr Cys Gly Val
305                 310                 315                 320

Leu Leu Leu Ser Leu Val Ile Thr Leu Tyr Cys Lys Arg Gly Arg Lys
                325                 330                 335

Lys Leu Leu Tyr Ile Phe Lys Gln Pro Phe Met Arg Pro Val Gln Thr
            340                 345                 350

Thr Gln Glu Glu Asp Gly Cys Ser Cys Arg Phe Pro Glu Glu Glu Glu
        355                 360                 365

Gly Gly Cys Glu Leu Arg Val Lys Phe Ser Arg Ser Ala Asp Ala Pro
    370                 375                 380

Ala Tyr Gln Gln Gly Gln Asn Gln Leu Tyr Asn Glu Leu Asn Leu Gly
385                 390                 395                 400
```

Arg Arg Glu Glu Tyr Asp Val Leu Asp Lys Arg Arg Gly Arg Asp Pro
            405                 410                 415

Glu Met Gly Gly Lys Pro Gln Arg Arg Lys Asn Pro Gln Glu Gly Leu
            420                 425                 430

Tyr Asn Glu Leu Gln Lys Asp Lys Met Ala Glu Ala Tyr Ser Glu Ile
            435                 440                 445

Gly Met Lys Gly Glu Arg Arg Arg Gly Lys Gly His Asp Gly Leu Tyr
        450                 455                 460

Gln Gly Leu Ser Thr Ala Thr Lys Asp Thr Tyr Asp Ala Leu His Met
465                 470                 475                 480

Gln Ala Leu Pro Pro Arg
                485

<210> SEQ ID NO 14
<211> LENGTH: 486
<212> TYPE: PRT
<213> ORGANISM: Artificial Sequence
<220> FEATURE:
<223> OTHER INFORMATION: MURINE (ARI2m)

<400> SEQUENCE: 14

Met Glu Ala Pro Ala Gln Leu Leu Phe Leu Leu Leu Leu Trp Leu Pro
1               5                   10                  15

Asp Thr Thr Gly Gln Val Gln Leu Gln Gln Ser Gly Gly Gly Leu Val
            20                  25                  30

Gln Pro Gly Gly Ser Leu Lys Leu Ser Cys Ala Ala Ser Gly Ile Asp
        35                  40                  45

Phe Ser Arg Tyr Trp Met Ser Trp Val Arg Arg Ala Pro Gly Lys Gly
    50                  55                  60

Leu Glu Trp Ile Gly Glu Ile Asn Pro Asp Ser Ser Thr Ile Asn Tyr
65                  70                  75                  80

Ala Pro Ser Leu Lys Asp Lys Phe Ile Ile Ser Arg Asp Asn Ala Lys
                85                  90                  95

Asn Thr Leu Tyr Leu Gln Met Ser Lys Val Arg Ser Glu Asp Thr Ala
            100                 105                 110

Leu Tyr Tyr Cys Ala Ser Leu Tyr Tyr Asp Tyr Gly Asp Ala Met Asp
        115                 120                 125

Tyr Trp Gly Gln Gly Thr Ser Val Thr Val Ser Ser Gly Gly Gly Gly
    130                 135                 140

Ser Gly Gly Gly Gly Ser Gly Gly Gly Gly Ser Asp Ile Val Met Thr
145                 150                 155                 160

Gln Ser Gln Arg Phe Met Thr Thr Ser Val Gly Asp Arg Val Ser Val
                165                 170                 175

Thr Cys Lys Ala Ser Gln Ser Val Asp Ser Asn Val Ala Trp Tyr Gln
            180                 185                 190

Gln Lys Pro Arg Gln Ser Pro Lys Ala Leu Ile Phe Ser Ala Ser Leu
        195                 200                 205

Arg Phe Ser Gly Val Pro Ala Arg Phe Thr Gly Ser Gly Ser Gly Thr
    210                 215                 220

Asp Phe Thr Leu Thr Ile Ser Asn Leu Gln Ser Glu Asp Leu Ala Glu
225                 230                 235                 240

Tyr Phe Cys Gln Gln Tyr Asn Asn Tyr Pro Leu Thr Phe Gly Ala Gly
                245                 250                 255

Thr Lys Leu Glu Leu Lys Thr Thr Thr Pro Ala Pro Arg Pro Pro Thr
            260                 265                 270

```
Pro Ala Pro Thr Ile Ala Ser Gln Pro Leu Ser Leu Arg Pro Glu Ala
            275                 280                 285

Cys Arg Pro Ala Ala Gly Gly Ala Val His Thr Arg Gly Leu Asp Phe
290                 295                 300

Ala Cys Asp Ile Tyr Ile Trp Ala Pro Leu Ala Gly Thr Cys Gly Val
305                 310                 315                 320

Leu Leu Leu Ser Leu Val Ile Thr Leu Tyr Cys Lys Arg Gly Arg Lys
            325                 330                 335

Lys Leu Leu Tyr Ile Phe Lys Gln Pro Phe Met Arg Pro Val Gln Thr
            340                 345                 350

Thr Gln Glu Glu Asp Gly Cys Ser Cys Arg Phe Pro Glu Glu Glu Glu
            355                 360                 365

Gly Gly Cys Glu Leu Arg Val Lys Phe Ser Arg Ser Ala Asp Ala Pro
            370                 375                 380

Ala Tyr Gln Gln Gly Gln Asn Gln Leu Tyr Asn Glu Leu Asn Leu Gly
385                 390                 395                 400

Arg Arg Glu Glu Tyr Asp Val Leu Asp Lys Arg Arg Gly Arg Asp Pro
                405                 410                 415

Glu Met Gly Gly Lys Pro Gln Arg Arg Lys Asn Pro Gln Glu Gly Leu
            420                 425                 430

Tyr Asn Glu Leu Gln Lys Asp Lys Met Ala Glu Ala Tyr Ser Glu Ile
            435                 440                 445

Gly Met Lys Gly Glu Arg Arg Arg Gly Lys Gly His Asp Gly Leu Tyr
            450                 455                 460

Gln Gly Leu Ser Thr Ala Thr Lys Asp Thr Tyr Asp Ala Leu His Met
465                 470                 475                 480

Gln Ala Leu Pro Pro Arg
                485

<210> SEQ ID NO 15
<211> LENGTH: 120
<212> TYPE: PRT
<213> ORGANISM: Artificial Sequence
<220> FEATURE:
<223> OTHER INFORMATION: murine VH

<400> SEQUENCE: 15

Gln Val Gln Leu Gln Gln Ser Gly Gly Gly Leu Val Gln Pro Gly Gly
1               5                   10                  15

Ser Leu Lys Leu Ser Cys Ala Ala Ser Gly Ile Asp Phe Ser Arg Tyr
            20                  25                  30

Trp Met Ser Trp Val Arg Arg Ala Pro Gly Lys Gly Leu Glu Trp Ile
        35                  40                  45

Gly Glu Ile Asn Pro Asp Ser Ser Thr Ile Asn Tyr Ala Pro Ser Leu
    50                  55                  60

Lys Asp Lys Phe Ile Ile Ser Arg Asp Asn Ala Lys Asn Thr Leu Tyr
65                  70                  75                  80

Leu Gln Met Ser Lys Val Arg Ser Glu Asp Thr Ala Leu Tyr Tyr Cys
                85                  90                  95

Ala Ser Leu Tyr Tyr Asp Tyr Gly Asp Ala Met Asp Tyr Trp Gly Gln
                100                 105                 110

Gly Thr Ser Val Thr Val Ser Ser
        115                 120

<210> SEQ ID NO 16
```

```
<211> LENGTH: 107
<212> TYPE: PRT
<213> ORGANISM: Artificial Sequence
<220> FEATURE:
<223> OTHER INFORMATION: Murine VL

<400> SEQUENCE: 16

Asp Ile Val Met Thr Gln Ser Gln Arg Phe Met Thr Thr Ser Val Gly
1               5                   10                  15

Asp Arg Val Ser Val Thr Cys Lys Ala Ser Gln Ser Val Asp Ser Asn
            20                  25                  30

Val Ala Trp Tyr Gln Gln Lys Pro Arg Gln Ser Pro Lys Ala Leu Ile
        35                  40                  45

Phe Ser Ala Ser Leu Arg Phe Ser Gly Val Pro Ala Arg Phe Thr Gly
    50                  55                  60

Ser Gly Ser Gly Thr Asp Phe Thr Leu Thr Ile Ser Asn Leu Gln Ser
65                  70                  75                  80

Glu Asp Leu Ala Glu Tyr Phe Cys Gln Gln Tyr Asn Asn Tyr Pro Leu
                85                  90                  95

Thr Phe Gly Ala Gly Thr Lys Leu Glu Leu Lys
            100                 105
```

CAR T-CELLS AGAINST BCMA FOR THE TREATMENT OF MULTIPLE MYELOMA

STATEMENT REGARDING SEQUENCE LISTING

The Sequence Listing associated with this application is provided in text format in lieu of a paper copy, and is hereby incorporated by reference into the specification. The name of the text file containing the Sequence Listing is SEQUENCE_LISTING 370108_401USPC.txt. The text file is 22.8 KB, was created on Feb. 1, 2022, and is being submitted electronically via EFS-Web.

TECHNICAL FIELD OF THE INVENTION

The present invention provides therapeutics for the treatment of Multiple myeloma. In particular, the present invention provides chimeric antigen receptor (CAR) T-cells that can target the B cell maturation antigen.

BACKGROUND OF THE INVENTION

Multiple myeloma (MM) remains an incurable hematologic malignancy responsible for 1% of all cancers and 15-20% of all hematological malignancies, with an average increase of 0.8% of new cases each year over the past decade. MM is characterized by clonal expansion of malignant plasma cells in the bone marrow (BM), which leads to an excessive production of monoclonal immunoglobulin (Ig) in blood and/or urine, causing osteolytic lesions with associated clinical symptoms including hypercalcemia, infections and organ dysfunction. The natural history of MM is relapse until refractory disease without reaching a plateau of survival with less than 10% of patients achieving sustained complete remission (CR) beyond 5-10 years after autologous stem-cell transplantation (ASCT). Moreover, patients are rarely cured after high-dose chemotherapy followed by ASCT and importantly, patients achieving CR have a longer survival than those who fail to obtain CR. Therefore, novel strategies are required to improve the survival of R/R MM patients, especially in high-risk patients, with adverse cytogenetics.

In the recent years, chimeric antigen receptor (CAR) T-cell immunotherapy, based on the infusion of genetically modified autologous T cells to recognize an antigen expressed on the tumor cell, has changed the modality of treatment for certain hematological malignancies. Specifically, in acute lymphoblastic leukemia (ALL) and lymphomas this treatment by targeting CD19 has achieved outstanding responses leading to the approval by the FDA of these novel treatments. In MM, B cell maturation antigen (BCMA), a transmembrane glycoprotein involved in the regulation of B cell maturation and survival, with specific and restricted expression in mature B and plasma cells, has appeared as the most promising target for CART cell immunotherapy.

All on-going clinical studies in MM patients with CARTBCMA cells have shown that in comparison to CART19, a higher dose of CART cells is required to achieve responses, being 150×106 of CART cells the lower dose required to obtain response. Moreover, it has been shown that a deepening of the response is obtained over time as the number of very good partial responses evolves to complete responses over time. In addition, with the aim to avoid relapses due to early disappearance of CART cells, the use of humanized or human CARs instead of murine CARs is appearing as the current tendency in CART cell immunotherapy (Sommermeyer D, Hill T, Shamah S M, et al. Fully human CD19-specific chimeric antigen receptors for T-cell therapy. Leukemia. 2017; 31(10):2191-2199; Turtle C J, Hanafi L A, Berger C, et al. CD19 CAR-T cells of defined CD4+:CD8+ composition in adult B cell ALL patients. J Clin Invest. 2016; 126(6):2123-2138).

Here, starting from a CART19 (ARI1) which is already being used in a multicenter clinical trial Phase II for B cell malignancies (Castella M, Boronat A, Martin-Ibanez R, Rodriguez V, Sune G, Caballero M, et al. Development of a Novel Anti-CD19 Chimeric Antigen Receptor: A Paradigm for an Affordable CAR T Cell Production at Academic Institutions. Mol Ther Methods Clin Dev. 2019 Mar. 15; 12:134-44), we generated a murine CART cells against BCMA (ARI2m) which could be used by patients in a public healthcare system. Once we confirmed its in vitro and in vivo efficacy, ARI2m was humanized into ARI2h. The efficacy and inflammatory response of both ARI2m and ARI2h were compared showing both CARs a comparable efficacy, and a lower inflammatory profile for ARI2h was observed. Moreover, the expansion at GMP clinical scale at our Institution has been successfully achieved for both CARs. Finally, the impact of soluble BCMA (sBCMA) in ARI2 activity was analyzed demonstrating how sBCMA can impact negatively the CART activity. All these results will allow the performance of a multicenter Clinical Trial for MM patients with our ARI2h cells in Spain.

DETAILED DESCRIPTION OF THE INVENTION

Definitions

Figure 1:
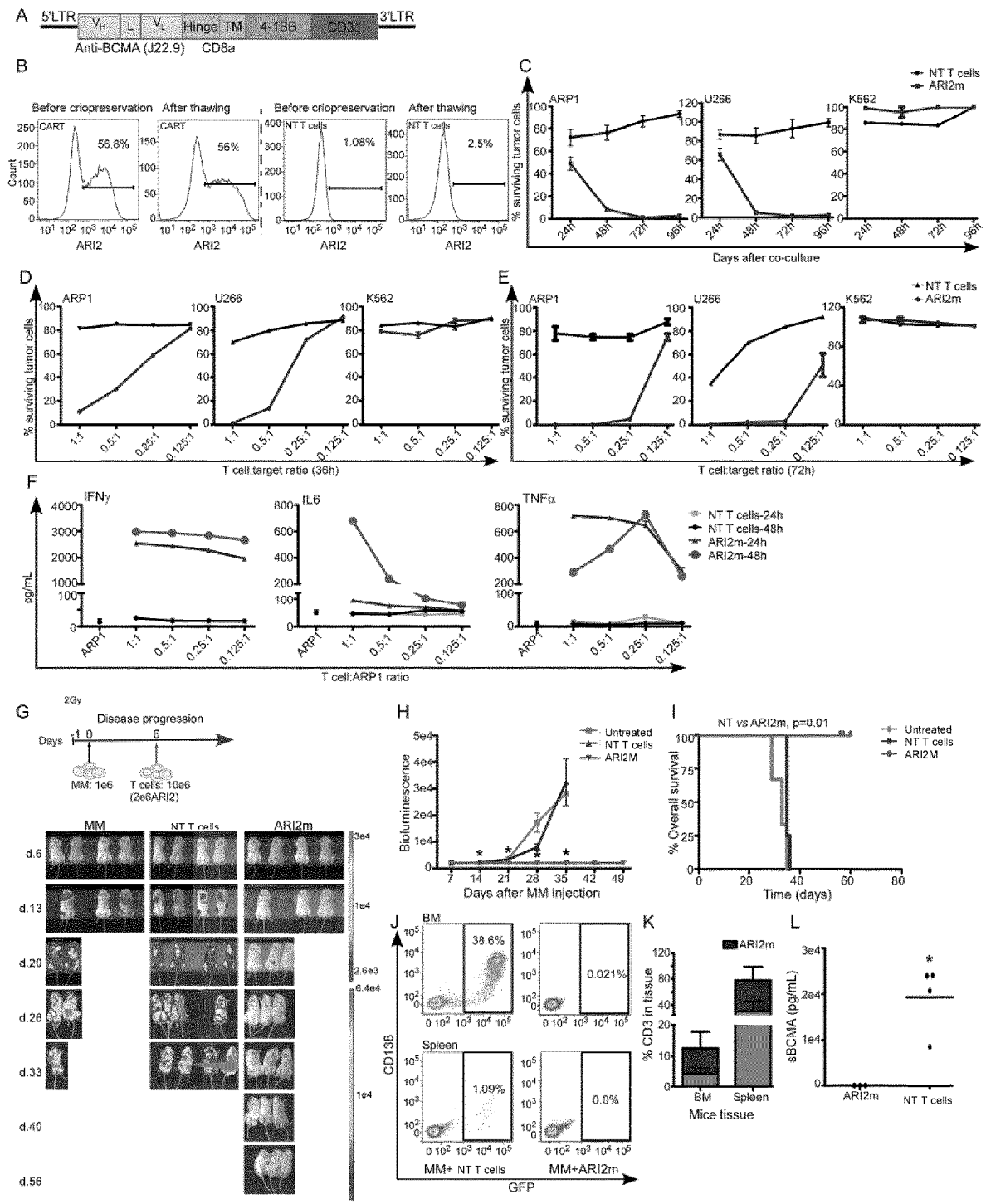
FIG. 1: Design and functional characterization of a CARTBCMA murine (ARI2m) against multiple myeloma (MM) cells. (A) Design of ARI2m. (B) Transduction efficiency of ARI2 and NT T cells before and after cryopreservation. (C) Cytotoxicity assays of ARI2 against two MM cell lines (ARP1 and U266) and one non-myeloma cell line (K562). Limiting dilution cytotoxicity assay against ARP1 and U266 (MM cell lines) and K562 (CML) performed at ratios from 1:1 to 0.125.1 (T cell:Tumor cell line) at 36 h (D) and at 72 h (E). (F) Cytokine profile of IFNγ, IL-6 and TNF-α after 24 h and 48 h of coculture (T cells and ARP1 cells). (G-K) In vivo efficacy of ARI2m cells: (G): Diagram of experimental design and quantification of disease progression by bioluminescence weekly (H) and overall survival of mice treated with ARI2m vs NT T cells group vs untreated group (I). (J) Flow cytometry of bone marrow (BM) and spleen of mice at the end of the experiment. (K) Percentage of total T cells and CART cells in BM and spleen in mice treated with ARI2m. (L). Soluble BCMA (sBCMA) ELISA from mice serum after being treated with ARI2m or NT T cells.

"Administering" or "administration of" a medicament to a patient (and grammatical equivalents of this phrase) refers to direct administration, which may be administration to a patient by a medical professional or may be self-administration, and/or indirect administration, which may be the act of prescribing a drug. E.g., a physician who instructs a patient to self-administer a medicament or provides a patient with a prescription for a drug is administering the drug to the patient.

The term "affibody" refers to a protein that is derived from the Z domain of protein A and that has been engineered to bind to a specific target (see Frejd & Kim, 2017. Exp Mol Med. 49(3): e306).

The term "antibody" refers to a molecule comprising at least one immunoglobulin domain that binds to, or is immunologically reactive with, a particular target. The term includes whole antibodies and any antigen binding portion or single chains thereof and combinations thereof; for instance, the term "antibody" in particular includes bivalent antibodies and bivalent bi-specific antibodies.

A typical type of antibody comprises at least two heavy chains ("HC") and two light chains ("LC") interconnected by disulfide bonds.

Each "heavy chain" comprises a "heavy chain variable domain" (abbreviated herein as "VH") and a "heavy chain constant domain" (abbreviated herein as "CH"). The heavy chain constant domain typically comprises three constants domains, CH1, CH2, and CH3.

Each "light chain" comprises a "light chain variable domain" (abbreviated herein as "VL") and a "light chain constant domain" ("CL"). The light chain constant domain (CL) can be of the kappa type or of the lambda type. The VH and VL domains can be further subdivided into regions of hypervariability, termed Complementarity Determining Regions ("CDR"), interspersed with regions that are more conserved, termed "framework regions" ("FW").

Each VH and VL is composed of three CDRs and four FWs, arranged from amino-terminus to carboxy-terminus in the following order: FW1, CDR1, FW2, CDR2, FW3, CDR3, FW4. The present disclosure inter alia presents VH and VL sequences as well as the subsequences corresponding to CDR1, CDR2, and CDR3.

The precise amino acid sequence boundaries of a given CDR can be determined using any of a number of well-known schemes, including those described by Kabat et al. (1991), "Sequences of Proteins of Immunological Interest," 5th Ed. Public Health Service, National Institutes of Health, Bethesda, MD ("Kabat" numbering scheme), Al-Lazikani et al., (1997) JMB 273,927-948 ("Chothia" numbering scheme).

Accordingly, a person skilled in the art would understand that the sequences of FW1, FW2, FW3 and FW4 are equally disclosed. For a particular VH, FW1 is the subsequence between the N-terminus of the VH and the N-terminus of H-CDR1, FW2 is the subsequence between the C-terminus of H-CDR1 and the N-terminus of H-CDR2, FW3 is the subsequence between the C-terminus of H-CDR2 and the N-terminus of H-CDR3, and FW4 is the subsequence between the C-terminus of H-CDR3 and the C-terminus of the VH. Similarly, for a particular VL, FW1 is the subsequence between the N-terminus of the VL and the N-terminus of L-CDR1, FW2 is the subsequence between the C-terminus of L-CDR1 and the N-terminus of L-CDR2. FW3 is the subsequence between the C-terminus of L-CDR2 and the N-terminus of L-CDR3, and FW4 is the subsequence between the C-terminus of L-CDR3 and the C-terminus of the VL.

The variable domains of the heavy and light chains contain a region that interacts with a binding target, and this region interacting with a binding target is also referred to as an "antigen-binding site" or "antigen binding site" herein. The constant domains of the antibodies can mediate the binding of the antibody to host tissues or factors, including various cells of the immune system (e.g., effector cells) and the first component (C1q) of the classical complement system. Exemplary antibodies of the present disclosure include typical antibodies, but also bivalent fragments and variations thereof such as a F(ab')2.

As used herein, the term "antibody" encompasses intact polyclonal antibodies, intact monoclonal antibodies, bivalent antibody fragments (such as F(ab')2), multispecific antibodies such as bispecific antibodies, chimeric antibodies, humanized antibodies, human antibodies, and any other modified immunoglobulin molecule comprising an antigen binding site.

An antibody can be of any the five major classes (isotypes) of immunoglobulins: IgA, IgD, IgE, IgG, and IgM, or subclasses thereof (e.g. IgG1, IgG2, IgG3, IgG4, IgA1 and IgA2), based on the identity of their heavy-chain constant domains referred to as alpha, delta, epsilon, gamma, and mu, respectively. The different classes of immunoglobulins have different and well-known subunit structures and three-dimensional configurations. Antibodies can be naked or conjugated to other molecules such as therapeutic agents or diagnostic agents to form immunoconjugates.

The term "antigen-binding fragment" or "Fab" refers to an antibody fragment comprising one constant and one variable domain of each of the heavy and light chain. A Fab fragment may be obtained by digesting an intact monoclonal antibody with papain.

The term "Multiple myeloma" also known as plasma cell myeloma, is a cancer of plasma cells, a type of white blood cell which normally produces antibodies. Often, no symptoms are noticed initially. When advanced, bone pain, bleeding, frequent infections, and anemia may occur. Complications may include amyloidosis.

The term "B-cell maturation antigen" (BCMA or BCM), also known as tumor necrosis factor receptor superfamily member 17 (TNFRSF17), is a protein that in humans is encoded by the TNFRSF17 gene.

The term "BCMA-targeting moiety" refers to a substance that is able to bind BCMA. Within the context of a CAR, a BCMA-targeting moiety targets T cells to a BCMA-positive cell, preferably a cancer cell. Within the context of a CAR, it is to be understood that the BCMA-targeting moiety is genetically encodable.

The term "chimeric antigen receptor" or "CAR" refers to a synthetic receptor that targets T cells to a chosen antigen and reprograms T cell function, metabolism and persistence (see Rivière & Sadelain, 2017. *Mol Ther.* 25(5):1117-1124). Similarly, the term "CART" refers to a T cell that comprises a CAR.

"Combination therapy", "in combination with" or "in conjunction with" as used herein denotes any form of concurrent, parallel, simultaneous, sequential or intermittent treatment with at least two distinct treatment modalities (i.e., compounds, components, targeted agents or therapeutic agents). As such, the terms refer to administration of one treatment modality before, during, or after administration of the other treatment modality to the subject. The modalities in combination can be administered in any order. The therapeutically active modalities are administered together (e.g., simultaneously in the same or separate compositions, formulations or unit dosage forms) or separately (e.g., on the same day or on different days and in any order as according to an appropriate dosing protocol for the separate compositions, formulations or unit dosage forms) in a manner and dosing regimen prescribed by a medical care taker or according to a regulatory agency. In general, each treatment modality will be administered at a dose and/or on a time schedule determined for that treatment modality. Optionally, three or more modalities may be used in a combination therapy. Additionally, the combination therapies provided herein may be used in conjunction with other types of treatment. For example, other anti-cancer treatment may be selected from the group consisting of chemotherapy, surgery, radiotherapy (radiation) and/or hormone therapy, amongst other treatments associated with the current standard of care for the subject.

A "complete response" or "complete remission" or "CR" indicates the disappearance of all target lesions as defined in the RECIST v1.1 guideline. This does not always mean the cancer has been cured.

The term "costimulatory signaling domain" refers to a signaling moiety that provides to T cells a signal which, in addition to the primary signal provided by for instance the CD3ζ chain of the TCR/CD3 complex, mediates a T cell response, including, but not limited to, activation, proliferation, differentiation, cytokine secretion, and the like. A co-stimulatory domain, in the context of the present invention, is 4-1BB. The term "4-IBB" refers to a membrane receptor protein also termed CD137, which is a member of the tumor necrosis factor receptor (TNFR) superfamily expressed on the surface of activated T-cells as a type of accessory molecule [Kwon et al., Proc. Natl. Acad. Sci. USA 86:1963 (1989); PoUok et al., J. Immunol. 151:771 (1993)]. 4-1BB has a molecular weight of 55 kDa, and is found as a homodimer. It has been suggested that 4-1BB mediates a signal transduction pathway from outside of the cell to inside [Kim et al., J. Immunol. 151:1255 (1993)]. A human 4-1BB gene was isolated from a cDNA library made from activated human peripheral T-cell mRNA [Goodwin et al., Eur. J. Immunol. 23:2631 (1993);]. The amino acid sequence of human 4-1BB shows 60% homology to mouse 4-1BB [Kwon et al., Proc. Natl. Acad. Sci. USA 86:1963 (1989); Gen Bank No: NM_011612] which indicates that the sequences are highly conserved. As mentioned supra, 4-1BB belongs to the TNFR superfamily, along with CD40, CD27, TNFR-I, TNFR-II, Fas, and CD30 [Alderson et al., Eur. J. Immunol. 24:2219 (1994)]. When a monoclonal antibody is bound to 4-1BB expressed on the surface of the T-cells, anti-CD3 T-cell activation is increased many fold [Pollok et al., J. Immunol. 150:771 (1993)]. 4-1BB binds to a high affinity ligand (4-1BBL, also termed CD137L) expressed on several antigen-presenting cells such as macrophages and activated B cells [Pollok et al., J. Immunol. 150:771 (1993) Schwarz et al., Blood 85:1043 (1995)]. 4-1BBL is claimed and described in U.S. Pat. No. 5,674,704. The interaction of 4-1BB and its ligand provides a co-stimulatory signal leading to T cell activation and growth [Goodwin et al., Eur. J. Immunol. 23:2631 (1993); Alderson et al., Eur. J. Immunol. 24:2219 (1994); Hurtado et al., J. Immunol. 155:3360 (1995); Pollock et al., Eur. J. Immunol. 25:488 (1995); DeBenedette et al., J. Exp. Med. 181:985 (1995)].

"Disease free survival" (DFS) refers to the length of time during and after treatment that the patient remains free of disease.

As used herein, the term "effective amount" of an agent, e.g., a therapeutic agent such as a CART, is that amount sufficient to effect beneficial or desired results, for example, clinical results, and, as such, an "effective amount" depends upon the context in which it is being applied. For example, in the context of administering a therapeutic agent that treats Multiple Myeloma, an effective amount can reduce the number of cancer cells; reduce the tumor size or burden; inhibit (i.e., slow to some extent and in a certain embodiment, stop) cancer cell infiltration into peripheral organs;

inhibit (i.e., slow to some extent and in a certain embodiment, stop) tumor metastasis; inhibit, to some extent, tumor growth; relieve to some extent one or more of the symptoms associated with the cancer; and/or result in a favorable response such as increased progression-free survival (PFS), disease-free survival (DFS), or overall survival (OS), complete response (CR), partial response (PR), or, in some cases, stable disease (SD), a decrease in progressive disease (PD), a reduced time to progression (TTP) or any combination thereof. The term "effective amount" can be used interchangeably with "effective dose," "therapeutically effective amount," or "therapeutically effective dose".

The terms "individual", "patient" or "subject" are used interchangeably in the present application to designate a human being and are not meant to be limiting in any way. The "individual", "patient" or "subject" can be of any age, sex and physical condition.

"Infusion" or "infusing" refers to the introduction of a therapeutic agent-containing solution into the body through a vein for therapeutic purposes. Generally, this is achieved via an intravenous bag.

"Intracellular signaling domain" as used herein refers to all or a portion of one or more domains of a molecule (here the chimeric receptor molecule) that provides for activation of a lymphocyte. Intracellular domains of such molecules mediate a signal by interacting with cellular mediators to result in proliferation, differentiation, activation and other effector functions. Examples of intracellular signaling domains for use in a CAR of the invention include the intracellular sequences of the CD3ζ chain, and/or co-receptors that act in concert to initiate signal transduction following CAR engagement, as well as any derivative or variant of these sequences and any synthetic sequence that has the same functional capability.

The term "monobody" refers to a protein that is derived from a fibronectin type III domain that has been engineered to bind to a specific target (see Koide et al., 2013. J Mol Biol. 415(2):393-405).

The term "nanobody" refers to a protein comprising the soluble single antigen-binding V-domain of a heavy chain antibody, preferably a camelid heavy chain antibody (see Bannas et al., 2017. Front Immunol. 8:1603).

"Overall Survival" (OS) refers to the time from patient enrollment to death or censored at the date last known alive. OS includes a prolongation in life expectancy as compared to naive or untreated individuals or patients. Overall survival refers to the situation wherein a patient remains alive for a defined period of time, such as one year, five years, etc., e.g., from the time of diagnosis or treatment.

A "partial response" or "PR" refers to at least a 30% decrease in the sum of diameters of target lesions, taking as reference the baseline sum diameter, in response to treatment, as defined in the RECIST v1.1 guideline.

The term "peptide aptamer" refers to a short, 5-20 amino acid residue sequence that can bind to a specific target. Peptide aptamers are typically inserted within a loop region of a stable protein scaffold (see Reverdatto et al., 2015. Curr Top Med Chem. 15(12):1082-101).

As used herein, "pharmaceutically acceptable carrier" or "pharmaceutically acceptable diluent" means any and all solvents, dispersion media, coatings, antibacterial and antifungal agents, isotonic and absorption delaying agents, compatible with pharmaceutical administration. The use of such media and agents for pharmaceutically active substances is well known in the art. Acceptable carriers, excipients, or stabilizers are nontoxic to recipients at the dosages and concentrations employed and, without limiting the scope of the present invention, include: additional buffering agents; preservatives; co-solvents; antioxidants, including ascorbic acid and methionine; chelating agents such as EDTA; metal complexes (e.g., Zn-protein complexes); biodegradable polymers, such as polyesters; salt-forming counterions, such as sodium, polyhydric sugar alcohols; amino acids, such as alanine, glycine, glutamine, asparagine, histidine, arginine, lysine, ornithine, leucine, 2-phenylalanine, glutamic acid, and threonine; organic sugars or sugar alcohols, such as lactitol, stachyose, mannose, sorbose, xylose, ribose, ribitol, myoinisitose, myoinisitol, galactose, galactitol, glycerol, cyclitols (e.g., inositol), polyethylene glycol; sulfur containing reducing agents, such as urea, glutathione, thioctic acid, sodium thioglycolate, thioglycerol, [alpha]-monothioglycerol, and sodium thiosulfate; low molecular weight proteins, such as human serum albumin, bovine serum albumin, gelatin, or other immunoglobulins; and hydrophilic polymers, such as polyvinylpyrrolidone. Other pharmaceutically acceptable carriers, excipients, or stabilizers, such as those described in Remington's Pharmaceutical Sciences 16th edition, Osol, A. Ed. (1980) may also be included in a pharmaceutical composition described herein, provided that they do not adversely affect the desired characteristics of the pharmaceutical composition.

"Progressive disease" or "disease that has progressed" refers to the appearance of one more new lesions or tumors and/or the unequivocal progression of existing non-target lesions as defined in the RECIST v1.1 guideline. Progressive disease or disease that has progressed can also refer to a tumor growth of more than 20 percent since treatment began, either due to an increase in mass or in spread of the tumor.

"Progression free survival" (PFS) refers to the time from enrollment to disease progression or death. PFS is generally measured using the Kaplan-Meier method and Response Evaluation Criteria in Solid Tumors (RECIST) 1.1 standards. Generally, progression free survival refers to the situation wherein a patient remains alive, without the cancer getting worse.

The term "RECIST" means Response Evaluation Criteria in Solid Tumours. RECIST guideline, criteria, or standard, describes a standard approach to solid tumor measurement and definitions for objective assessment of change in tumor size for use in adult and pediatric cancer clinical trials. RECIST v1.1 means version 1.1 of the revised RECIST guideline and it is published in European Journal of Cancers 45 (2009) 228-247.

The term "repebody" refers to a protein that is derived from a leucine-rich repeat module and that been engineered to bind to a specific target (see Lee et al., 2012. PNAS. 109(9): 3299-3304).

The term "respond favourably" generally refers to causing a beneficial state in a subject. With respect to cancer treatment, the term refers to providing a therapeutic effect on the subject. Positive therapeutic effects in cancer can be measured in a number of ways (See, Weber, 2009. J Nucl Med. 50 Suppl 1:1S-10S). For example, tumor growth inhibition, molecular marker expression, serum marker expression, and molecular imaging techniques can all be used to assess therapeutic efficacy of an anti-cancer therapeutic. With respect to tumor growth inhibition, according to NCI standards, a T/C ≤42% is the minimum level of anti-tumor activity. A T/C <10% is considered a high anti-tumor activity level, with T/C (%)=Median tumor volume of the treated/Median tumor volume of the control×100. A favorable response can be assessed, for example, by increased progression-free survival (PFS), disease-free survival (DFS), or overall survival (OS), complete response (CR), partial response (PR), or, in some cases, stable disease (SD), a decrease in progressive disease (PD), a reduced time to progression (TTP) or any combination thereof.

The term "sequence identity" refers to a percentage value obtained when two sequences are compared using a pairwise sequence alignment tool. In the present case, the sequence identity is obtained using the global alignment tool "EMBOSS Needle" using the default settings (Rice et al., 2000. Trends Genet. 16(6):276-7; Li et al., 2015. Nucleic Acids Res. 43(W1):W580-4). The global alignment tool is available at: www.ebi.ac.uk/Tools/psa/.

The term "single-chain antigen-binding fragment" or "scFab" refers to a fusion protein comprising one variable and one constant domain of the light chain of an antibody attached to one variable and one constant domain of the heavy chain of an antibody, wherein the heavy and light chains are linked together through a short peptide.

The term "single-chain variable fragment" or "scFv" refers to a fusion protein comprising the variable domains of the heavy chain (VH) and light chain (VL) of an antibody linked to one another with a peptide linker. The term also includes a disulfide stabilized Fv (dsFv). Methods of stabilizing scFvs with disulfide bonds are disclosed in Reiter et al., 1996. Nat Biotechnol. 14(10):1239-45.

"Stable disease" refers to disease without progression or relapse as defined in the RECIST v1.1 guideline. In stable disease there is neither sufficient tumor shrinkage to qualify for partial response, nor sufficient tumor increase to qualify as progressive disease.

"Time to Tumor Progression" (TTP) is defined as the time from enrollment to disease progression. TTP is generally measured using the RECIST v1.1 criteria.

The terms "treatment" and "therapy", as used in the present application, refer to a set of hygienic, pharmacological, surgical and/or physical means used with the intent to cure and/or alleviate a disease and/or symptoms with the goal of remediating the health problem. The terms "treatment" and "therapy" include preventive and curative methods, since both are directed to the maintenance and/or reestablishment of the health of an individual or animal. Regardless of the origin of the symptoms, disease and disability, the administration of a suitable medicament to alleviate and/or cure a health problem should be interpreted as a form of treatment or therapy within the context of this application.

Description

We have successfully developed CART cells directed against BCMA with 4-1BB as co-stimulatory domain (ARI2m cells) that will be administrated in a Multicenter Phase I clinical trial to treat MM patients who have relapsed or become refractory (R/R) to at least two lines of treatment including proteasome inhibitors, immunomodulatory agents and an anti-CD38 monoclonal antibody. Our ARI2m cells were humanized into ARI2h demonstrating that the anti-MM activity was retained in the humanized version and moreover, a lower cytotoxic profile was observed for ARI2h cells.

BCMA appeared as a promising antigen for the treatment of MM with CART cells in 2013 (Carpenter R O, Evbuomwan M O, Pittaluga S, et al. B-cell maturation antigen is a promising target for adoptive T-cell therapy of multiple myeloma. Clin Cancer Res. 2013; 19(8):2048-2060), leading in 2016, to the first clinical study in MM patients receiving CART BCMA cells with CD28 as co-stimulatory domain (Ali S A, Shi V, Maric I, et al. T cells expressing an anti-B-cell maturation antigen chimeric antigen receptor cause remissions of multiple myeloma. Blood. 2016; 128 (13):1688-1700). Even though these CART cells demonstrated efficacy, they displayed a high cytotoxic profile, as all patients treated with active doses developed severe CRS. Therefore, CD28 was replaced by 4-1BB, and the new CAR, termed bb2121, demonstrated manageable toxicity and that a minimum dose of $150\times10^6$ CART cells is required to obtain responses (Raje N, Berdeja J, Lin Y, et al. Anti-BCMA CAR T-Cell Therapy bb2121 in Relapsed or Refractory Multiple Myeloma. N Engl J Med. 2019; 380(18):1726-1737). In parallel, two additional studies in MM patients (Cohen A D, Garfall A L, Stadtmauer E A, et al. B cell maturation antigen-specific CAR T cells are clinically active in multiple myeloma. J Clin Invest. 2019; 130; and Zhao W H, Liu J, Wang B Y, et al. A phase 1, open-label study of LCAR-B38M, a chimeric antigen receptor T cell therapy directed against B cell maturation antigen, in patients with relapsed or refractory multiple myeloma. J Hematol Oncol. 2018; 11(1):141), demonstrated that a lower number of previous treatments led to better responses, and that even though lymphodepletion is not absolutely required for in vivo CAR T cell expansion and activity, short-term expansion is more consistent after lymphodepletion. Different factors influence CART expansion and persistence that will enhance the long-term control of the disease, a factor that needs to be improved with CARTBCMA therapy, as studies have shown that most MM patients end-up relapsing, a finding not observed in ALL patients treated with CART19. In this regard, persistence of CART cells could be improved with the use of human or humanized CARs, as the murine components of the scFv of the CAR initiates an immunological reaction by the human immune system leading to an early disappearance of CART cells. Based on these previous studies, and supported by our results showing that both ARI2m and ARI2h equally avoided disease progression, we selected ARI2h cells, which were humanized CARTBCMA cells with 4-1BB co-stimulatory domain.

Other factors impacting on CART cell persistence include the exhaustion profile of CART cells, and the CD4/CD8 ratio in the leukapheresis product, which in CARTBCMA cells correlated with in vivo CART expansion. In the present invention, regardless of the initial CD4/CD8 ratio, all in vitro expansions achieved a CD4/CD8>1 which after exposure to tumor cells normalized to approximately equal amounts of CD4 and CD8 due to preferential CD8T cell proliferation. Moreover, consecutive exposure to tumor cells demonstrated that ARI2h cells achieved a higher proliferation in comparison to ARI2m, suggesting a lower exhaustion of ARI2h cells. In this regard, studies in CART19 with CD28 and 4-1BB co-stimulatory domains have demonstrated that a strong activation of CART cells due to a high affinity or high expression of the target antigen leads to an effector T cell phenotype with increased exhaustion; on the contrary, a weaker activation due to lower affinity, leads to a T cell memory phenotype reducing exhaustion. Here, the humanization process involved a change in the aminoacid sequence that could have decreased CART affinity in ARI2h cells explaining their slower in vitro activity in assays after one challenge, and on the contrary, a sustained and higher CART cell proliferation after consecutive challenges to tumor cells, and a longer in vivo control of the disease in a very advanced tumor model.

A high incidence of CRS and neurotoxicity are common events occurring after CART cell administration, although they are efficiently managed following international guidelines, the ideal CART treatment should try to minimize CRS development. Here, the use of ARI2h cells instead of ARI2m is further supported by the observation of a lower in vivo toxic profile and a lower TNFα in vitro production of ARI2h in comparison to ARI2m cells. Whereas IL6 is the effector cytokine for CRS produced by monocytes and macrophages which exponentially increases as CRS develops, other cytokines such as TNFα and IL1β are the main initiators of CRS, as they are produced at early time points by monocytes and macrophages once they are activated by IFNγ produced by CART cells. In fact, TNFα, acts as an initiator cytokine orchestrating the cytokine cascade in many inflammatory diseases appearing as a therapeutic target for different inflammatory diseases. Here, our in vitro model with macrophages mimicking a more similar model to the in vivo scenario, demonstrates that ARI2h cells led to a lower TNFα production by macrophages, a relevant finding, as CRS in MM patients after CARTBCMA associated with a higher peak of TNFα.

Last, at this study the impact of sBCMA on CART activity was carefully analyzed confirming that sBCMA entertains CART cells from their targets and moreover, it can cause fratricide between CARTBCMA cells. Even though preclinical and clinical studies with CARTBCMA in MM have not found any correlation between sBCMA and CART activity, we observed that the high in vitro CART activity rapidly eliminating MM cells impedes to analyze properly the role of sBCMA in preclinical studies. Moreover, the high dose of CARTBCMA cells required in MM in comparison to CART19 in ALL patients to induce responses led us to hypothesize that sBCMA might be responsible for this high CART dose required. Therefore, our in vitro models performed at a low CARTBCMA:MM ratio, with the creation of an environment with continuous release of sBCMA, and the addition of a γ-secretase inhibitor confirmed the negative impact of sBCMA on CARTBCMA activity.

In conclusion, we herein present a CART BCMA (wherein the CAR corresponds to ARI2h of SEQ ID NO 13) with 4-1BB as co-stimulatory domain that has been humanized retaining a high efficacy and demonstrating a lower toxic profile than its murine counterpart (ARI2m). This CAR (ARI2h) is efficiently expanded under GMP conditions for its use in a clinical trial. Therefore, it is a main object of the present invention to protect the chimeric antigen receptor of ARI2h as well as variants thereof as described in the description below.

Chimeric Antigen Receptor of ARI2h and Variants Thereof

In one aspect, the present invention provides a chimeric antigen receptor (CAR) of ARI2h or variants thereof, comprising an extracellular domain comprising a BCMA targeting-moiety, a transmembrane domain, and an intracellular signaling domain. Such domains are thoroughly described below.

BCMA Targeting-Moiety

In some embodiments, the BCMA-targeting moiety is an antibody, anticalin, repebody, monobody, scFv, Fab, scFab, affibody, fynomer, DARPin, nanobody, or peptide aptamer that specifically binds to BCMA.

Binding molecules that bind specifically to BCMA may be very useful in the diagnosis and treatment of MM. Several murine monoclonal antibodies against BCMA are known in the field. However, murine antibodies are limited for in vivo use due to issues associated with the administration of murine antibodies to humans, such as short serum half-life, the inability to trigger certain human effector functions and the generation of an undesired immune response against the murine antibody. New human antibodies have been developed overcoming these previously mentioned drawbacks.

Phage display and combinatorial methods for generating antibodies are known in the art (as described in, e.g., Ladner et al. U.S. Pat. No. 5,223,409; Kang et al. International Publication No. WO 92/18619; Dower et al. International Publication No. WO 91/17271; Winter et al. International Publication WO 92/20791; Markland et al. International Publication No. WO 92/15679; Breitling et al. International Publication WO 93/01288; McCafferty et al. International Publication No. WO 92/01047; Garrard et al. International Publication No. WO 92/09690; Ladner et al. International Publication No. WO 90/02809; Fuchs et al. (1991) Bio/Technology 9:1370-1372; Hay et al. (1992) Hum Antibod Hybridomas 3:81-85; Huse et al. (1989) Science 246:1275-1281; Griffths et al. (1993) EMBO J 12:725-734; Hawkins et al. (1992) J Mol Biol 226:889-896; Clackson et al. (1991) Nature 352:624-628; Gram et al. (1992) PNAS 89:3576-3580; Garrad et al. (1991) Bio/Technology 9:1373-1377; Hoogenboom et al. (1991) Nuc Acid Res 19:4133-4137; and Barbas et al. (1991) PNAS 88:7978-7982, the contents of all of which are incorporated by reference herein).

Further, methods of generating and selecting non-immunglobulin scaffolds that bind to a particular target are known in the art (see, for example, Škrlec, et al., 2015. Trends Biotechnol. 33(7):408-18).

In some embodiments, the BCMA-targeting moiety, preferably an antibody, scFv, Fab, or scFab, comprises a VH domain, wherein said VH domain comprises or consists of SEQ ID NO 1:

*EVQLVESGGGLVQPGGSLRLSCAASGIDFSRYWMSWVRQAPGKGLEWIGE*

*INPDSSTINYAPSLKDRFTISRDNAKNSLYLQMNSLRAEDTAVYYCASLY*

*YDYGDAMDYWGQGTLVTVSS* or a variant thereof having at least an 85%, 90% 95%, 96%, 97%, 98%, or 99% sequence identity with SEQ ID NO 1.

In some embodiments, the BCMA-targeting moiety, preferably an antibody, scFv, Fab, or scFab, comprises the above mentioned VH domain and further comprises a VL domain, wherein said VL domain comprises or consist of SEQ ID NO 2:

*DIQMTQSPSSLSASVGDRVTITCKASQSVDSNVAWYQQKPGKAPKALIFS*

*ASLRFSGVPSRFSGSGSGTDFTLTISSLQPEDFATYYCQQYNNYPLTFGG*

*GTKVEIK* or a variant thereof having at least an 85%, 90% 95%, 96%, 97%, 98%, or 99% sequence identity with SEQ ID NO 2.

In some embodiments, the BCMA-targeting moiety, preferably an antibody, scFv, Fab, or scFab, comprises a VL domain and a VH domain, wherein said VL and VH domain comprises or consists of SEQ ID NO 1 and 2 or a variant of any of these sequences as defined above. Preferably said sequence VL and VH domain comprises or consists of SEQ ID NO 3:

EVQLVESGGGLVQPGGSLRLSCAASGIDFSRYWMSWVRQAPGKGLEWIGE

INPDSSTINYAPSLKDRFTISRDNAKNSLYLQMNSLRAEDTAVYYCASLY

YDYGDAMDYWGQGTLVTVS*GGGGSGGGGSGGGGS*DIQMTQSPSSLSA

SVGDRVTITCKASQSVDSNVAWYQQKPGKAPKALIFSASLRFSGVPSRFS

GSGSGTDFTLTISSLQPEDFATYYCQQYNNYPLTFGGGTKVEIK or a variant thereof having at least an 85%, 90% 95%, 96%, 97%, 98%, or 99% sequence identity with SEQ ID NO 3.

It is herein noted that the above mentioned VL and VH domain of SEQ ID NO 3 comprises a linker sequence, in particular SEQ ID NO 4: GGGGSGGGGSGGGGS. Other linker sequences might, however, be used.

It is further noted that the VL and VH domain, in particular SEQ ID NO 3, might further comprise a peptide signal, wherein preferably said signal peptide comprises or consists of SEQ ID NO 5: MEAPAQLLFLLLLWLPDTTG or a variant thereof having at least an 85%, 90% 95%, 96%, 97%, 98%, or 99% sequence identity with SEQ ID NO 5.

In some embodiments, the BCMA-targeting moiety, preferably an antibody, scFv, Fab, or scFab, comprises or consists of SEQ ID NO 6:

MEAPAQLLFLLLLWLPDTTGEVQLVESGGGLVQPGGSLRLSCAASGIDFS

RYWMSWVRQAPGKGLEWIGEINPDSSTINYAPSLKDRFTISRDNAKNSLY

LQMNSLRAEDTAVYYCASLYYDYGDAMDYWGQGTLVTVSSGGGGSGGGGS

GGGGSDIQMTQSPSSLSASVGDRVTITCKASQSVDSNVAWYQQKPGKAPK

ALIFSASLRFSGVPSRFSGSGSGTDFTLTISSLQPEDFATYYCQQYNNYP

LTFGGGTKVEIK.

or a variant thereof having at least an 85%, 90% 95%, 96%, 97%, 98%, or 99% sequence identity with SEQ ID NO 6.

Transmembrane Domain

The transmembrane domain may be derived either from a natural or a synthetic source. When the source is natural, the domain may be derived from any membrane-bound or transmembrane protein. Transmembrane regions may comprise at least the transmembrane region(s) of the α-, β- or ζ-chain of CD28, CD3, CD45, CD4, CD8, CD9, CD16, CD22, CD33, CD37, CD64, CD80, CD86, CD134, CD137, or CD154. Preferably, the transmembrane regions comprise at least the transmembrane region(s) CD8a.

A transmembrane domain may be synthetic or a variant of a naturally occurring transmembrane domain. In some embodiments, synthetic or variant transmembrane domains comprise predominantly hydrophobic residues such as leucine and valine.

In some embodiments, the transmembrane domain comprises the transmembrane domain of CD28, CD3, CD45, CD4, CD8, CD9, CD16, CD22, CD33, CD37, CD64, CD80, CD86, CD134, CD137, CD154, or a variant thereof, wherein the variant thereof has at least an 85%, 90% 95%, 96%, 97%, 98%, or 99% sequence identity. Preferably, the said transmembrane domain comprises or consists of at least the transmembrane domain of CD8a.

In some embodiments, the transmembrane domain comprises or consists of the transmembrane domain of CD8a or a variant thereof, wherein the variant thereof has at least 85%, 90% 95%, 96%, 97%, 98%, or 99% sequence identity.

In particular, in some embodiments, the transmembrane domain comprises or consists of SEQ ID NO: 7 or a variant thereof having at least an 85%, 90%,95%, 96%, 97%, 98%, or 99% sequence identity with SEQ ID NO 7.

Transmembrane domain derived from CD8a (SEQ ID NO 7: YIWAPLAGTCGVLLLSLVITLYC).

In some embodiments the domain derived from CD8a is bound directly to a CD8 hinge, preferably to SEQ ID NO 8:

TTTPAPRPPTPAPTIASQPLSLRPEACRPAAGGAVHTRGLDFACDI or to a variant thereof having at least an 85%, 90% 95%, 96%, 97%, 98%, or 99% sequence identity with SEQ ID NO 8.

Therefore, in further some embodiments the transmembrane domain further comprises a CD8 hinge and comprises or consists of SEQ ID NO: 9

TTTPAPRPPTPAPTIASQPLSLRPEACRPAAGGAVHTRGLDFACDIYIWA

PLAGTCGVLLLSLVITLYC or a variant thereof having at least an 85%, 90% 95%, 96%, 97%, 98%, or 99% sequence identity with SEQ ID NO 9.

Intracellular Signaling Domain

The intracellular signaling domain provides for the activation of at least one function of the cell expressing the CAR upon binding to the ligand expressed on tumor cells. In some embodiments, the intracellular signaling domain contains one or more intracellular signaling domains. In some embodiments, the intracellular signaling domain is a portion of and/or a variant of an intracellular signaling domain that provides for activation of at least one function of the CAR-comprising cell.

In some embodiments, the intracellular signaling domain comprises or consists of the intracellular domain of CD3ζ, FcRγ, CD3γ, CD3δ, CD3ε, CD5, CD22, CD79a, CD79b, CD66b, or a variant thereof, wherein the variant thereof has at least an 85%, 90% 95%, 96%, 97%, 98%, or 99% sequence identity.

In some embodiments, the intracellular signaling domain comprises or consists of the intracellular domain of CD3ζ or a variant thereof, wherein the variant thereof has at least an 85%, 90% 95%, 96%, 97%, 98%, or 99% sequence identity.

In some embodiments, the intracellular signaling domain comprises SEQ ID NO: 10, or a variant thereof having at least an 85%, 90% 95%, 96%, 97%, 98%, or 99% sequence identity with SEQ ID NO 10. It is noted that SEQ ID NO: 10 is represented by the following sequence:

RVKFSRSADAPAYQQGQNQLYNELNLGRREEYDVLDKRRGRDPEMGGKP

QRRKNPQEGLYNELQKDKMAEAYSEIGMKGERRRGKGHDGLYQGLSTAT

KDTYDALHMQALPPR

Costimulatory Signaling Domain

It is noted, that the CAR of the invention, the ARI2h CAR or variants thereof, must further comprise a costimulatory signaling domain. In some embodiments, the costimulatory signaling domain comprises the intracellular domain of 4-1BB or a variant thereof, wherein the variant thereof has at least an 85%, 90%, 95%, 96%, 97%, 98%, or 99% sequence identity.

In some embodiments, the costimulatory signaling domain comprises or consists of the intracellular domain of 4-1BB or a variant thereof, wherein the variant thereof has at least an 85%, 90% 95%, 96%, 97%, 98%, or 99% sequence identity.

In some embodiments, the costimulatory signaling domain comprises or consists of SEQ ID NO: 11 or to a variant thereof having at least an 85%, 90% 95%, 96%, 97%, 98%, or 99% sequence identity with SEQ ID NO 11. It is noted that the costimulatory signaling domain derived from 4-1BB is herein represented by SEQ ID NO: 11:

KRGRKKLLYIFKQPFMRPVQTTQEEDGCSCRFPEEEEGGCEL.

Full Sequence CARs According to the Present Invention

It is noted that the full amino acid sequence of the ARI2h CAR according to the present invention comprises or consists of SEQ ID NO 13:

MEAPAQLLFLLLLWLPDTTGEVQLVESGGGLVQPGGSLRLSCAASGIDFS

RYWMSWVRQAPGKGLEWIGEINPDSSTINYAPSLKDRFTISRDNAKNSLY

LQMNSLRAEDTAVYYCASLYYDYGDAMDYWGQGTLVTVSSGGGGSGGGGS

GGGGSDIQMTQSPSSLSASVGDRVTITCKASQSVDSNVAWYQQKPGKAPK

ALIFSASLRFSGVPSRFSGSGSGTDFTLTISSLQPEDFATYYCQQYNNYP

LTFGGGTKVEIKTTTPAPRPPTPAPTIASQPLSLRPEACRPAAGGAVHTR

GLDFACDIYIWAPLAGTCGVLLLSLVITLYCKRGRKKLLYIFKQPFMRPV

QTTQEEDGCSCRFPEEEEGGCELRVKFSRSADAPAYQQGQNQLYNELNLG

RREEYDVLDKRRGRDPEMGGKPQRRKNPQEGLYNELQKDKMAEAYSEIGM

KGERRRGKGHDGLYQGLSTATKDTYDALHMQALPPR wherein the signal Peptide consists of SEQ ID NO 5;
wherein the VH domain consists of SEQ ID NO 1;
wherein the linker sequence consists of SEQ ID NO 4;
wherein the VL domain consists of SEQ ID NO 2;
wherein the CD8 hinge consist of SEQ ID NO 8;
wherein the transmembrane domain consists of SEQ ID NO 7;
wherein the 4-1BB domain consists of SEQ ID NO 11; and
wherein the CD3z domain consists of SEQ ID NO 10.

In some embodiments, a CAR according to the present invention might be characterized by comprising:
(i) a BCMA-targeting moiety, preferably an antibody, scFv, Fab, or scFab, comprising or consisting of a VL domain and a VH domain, wherein said VH and VL domains respectively comprise or consists of SEQ ID NO 1 and 2 or any variants thereof, wherein the variants thereof has at least an 85%, 90% 95%, 96%, 97%, 98%, d or 99% sequence identity with any of SEQ ID NO 1 and/or 2;
(ii) a transmembrane domain bound to a Hinge domain comprising or consisting of SEQ ID NO: 9 or a variant thereof, wherein the variant thereof has at least an 85%, 90% 95%, 96%, 97%, 98%, or 99% sequence identity with SEQ ID NO 9;
(iii) a costimulatory signaling domain comprising or consisting of SEQ ID NO: 11 or a variant thereof, wherein the variant thereof has at least an 85%, 90% 95%, 96%, 97%, 98%, or 99% sequence identity with SEQ ID NO 11; and
(iv) an intracellular signaling domain comprising or consisting of SEQ ID NO: 10 or a variant thereof, wherein the variant thereof has at least an 85%, 90% 95%, 96%, 97%, 98%, or 99% sequence identity with SEQ ID NO 10.

In some embodiments, the CAR comprises or consists of SEQ ID NO: 13

MEAPAQLLFLLLLWLPDTTGEVQLVESGGGLVQPGGSLRLSCAASGIDFS

RYWMSWVRQAPGKGLEWIGEINPDSSTINYAPSLKDRFTISRDNAKNSLY

LQMNSLRAEDTAVYYCASLYYDYGDAMDYWGQGTLVTVSSGGGGSGGGGS

GGGGSDIQMTQSPSSLSASVGDRVTITCKASQSVDSNVAWYQQKPGKAPK

ALIFSASLRFSGVPSRFSGSGSGTDFTLTISSLQPEDFATYYCQQYNNYP

LTFGGGTKVEIKTTTPAPRPPTPAPTIASQPLSLRPEACRPAAGGAVHTR

GLDFACDIYIWAPLAGTCGVLLLSLVITLYCKRGRKKLLYIFKQPFMRPV

QTTQEEDGCSCRFPEEEEGGCELRVKFSRSADAPAYQQGQNQLYNELNLG

RREEYDVLDKRRGRDPEMGGKPQRRKNPQEGLYNELQKDKMAEAYSEIGM

KGERRRGKGHDGLYQGLSTATKDTYDALHMQALPPR or a variant thereof, wherein the variant thereof has at least an 85%, 90% 95%, 96%, 97%, 98%, or 99% sequence identity with SEQ ID NO 13.

Nucleic Acid

In one aspect, the present invention provides a nucleic acid encoding any one of the CARs of the present invention, including any one of the CARs disclosed above. The nucleic acid sequence that encodes the chimeric receptor links together a number of modular components that can be excised and replaced with other components in order to customize the chimeric receptor for efficient T cell activation and recognition of BCMA.

In some embodiments, the nucleic acid is suitable for transducing or transforming a cell. In some embodiments, the nucleic acid is suitable for transducing or transforming a T cell for use in adoptive immunotherapy.

In some embodiments, the nucleic acid is codon optimized for expression in mammalian cells. Codon optimization methods are known in the art (see, for example, Parret et al., 2016. Curr Opin Struct Biol. 39: 155-162).

The nucleic acid of the present invention may be comprised in a lentiviral vector which can be used to transduce or transform a T cell (see Rivière & Sadelain, 2017. Mol Ther. 25(5):1117-1124). Currently, transduction of T cells with lentiviral vectors is the technique more widely used in humans. The nucleic acid may also be inserted into a cell through the use of DNA transposons, RNA transfection or genome editing techniques such as TALEN, ZFN and CRISPR/Cas9 (see Rivière & Sadelain, 2017. Mol Ther. 25(5):1117-1124).

Preferably, the full nucleotide sequence of the CARS according to the present invention comprises or consists of SEQ ID NO: 12:

```
ATGGAGGCTCCAGCACAGCTCCTTTTTCTGCTCCTCCTGTGGCTCCCTGA

TACGACCGGAgaagttcaactcgtggagagcggtgggggactcgtacagc caggtggatctctcagactttcctgcgctgcatcaggcatagactttagt cggtactggatgagttgggtacgacaagctcctgggaagggcttggaatg gattggtgaaatcaacccgacagcagcaccataaattatgctccaagct tgaaagaccggttcactatatctcgggataatgctaaaaactcccttac cttcagatgaatagtctccgggcggaagatacggcggtgtattactgtgc ttctctgtactacgactatggcgatgcaatggactattgggccaaggta cgctggtgaccgtctcatctggggggggaggtagtggaggaggaggttca ggggggggcggaagtgatattcaaatgacacagtctccgtcttcactgag tgcttctgtaggggatcgagttacgatcacttgtaaggccagccaatccg tggattctaatgttgcgtggtatcagcagaagcccggcaaagcgcctaaa gcactgatatttagcgcatcactccgcttttccggggtccctccaggtt cagtggtagcgggtctggaacagacttcactctcactatatcttcattgc aaccagaagacttcgcgacctattactgtcagcaatacaataactacccg cttacgttcggcggcggcactaaagtcgaaatcaagACGACGACGccggc gccgagaccacctacacctgcaccaactattgcctctcagccactgagtc tgcgccccgaggcatgtcgacctgccgctggcggggctgtgcacaccagg ggcctagacttcgcctgcgatatctatatttgggctccactggcaggaac ctgtggcgtgctgctgctgtctctggtcatcacactgtactgcaaaagag gcaggaagaaactgctgtatattttcaagcagccctttatgagacctgtg cagacaactcaggaggaagacgggtgcagctgtaggttccctgaggaaga ggaaggaggctgtgagctgcgcgtgaaattttctcggagtgcagatgccc cagcttaccagcagggccagaaccagctgtataacgagctgaatctgggg cggagagaggaatacgacgtgctggataagagggcgcgggcgagatccaga aatgggaggaaaacccagcgacggaagaaccctcaggagggactgtaca atgaactgcagaaggacaaaatggcagaggcctattccgaaatcgggatg aaaggagaaagaaggcgcggcaaggggcatgatggcctgtatcagggact gtcaaccgcaacaaaagatacttatgatgctctgcacatgcaggctctgc ccccgcggta
```

Cells

In one aspect, the present invention provides a cell comprising the nucleic acid of the present invention and/or the CAR of the present invention. In some embodiments, the cell is a T-cell (referred to as a CART).

In some embodiments, the cell is a naïve T cell, memory stem T cell or central memory T cell. It is currently thought that these cells are better suited for adaptive immunotherapy (see Rivière & Sadelain, 2017. Mol Ther. 25(5):1117-1124).

In some embodiments, the cell is an autologous T cell. The term "autologous cell" refers to a cell obtained from the same patient that is to be treated using any one of the methods of the present invention.

In some embodiments, the cell is an allo-tolerant T cell. The term "alto-tolerant cell" refers to a cell that has been engineered to decrease the risk of a Graft-versus-host disease response. In some embodiments, this is achieved by genomic editing-mediated deletion of TCR and/or β2-microglobulin15, 19. Allo-tolerant cells are known in the art (see section of allogeneic T cells in Rivière & Sadelain, 2017. Mol Ther. 25(5):1117-1124).

In some embodiments, the cell is a lymphoid precursor, embryonic stem cell or an induced pluripotent stem cell with the capacity to differentiate into a mature T cell (see Rivière & Sadelain, 2017. Mol Ther. 25(5):1117-1124).

Pharmaceutical Composition

In one aspect, the present invention provides a pharmaceutical composition comprising a plurality of cells of the present invention and a pharmaceutically acceptable carrier or diluent.

A pharmaceutical composition as described herein may also contain other substances. These substances include, but are not limited to, cryoprotectants, surfactants, antioxidants, and stabilizing agents. The term "cryoprotectant" as used herein, includes agents, which provide stability to the CARTs against freezing-induced stresses. Non-limiting examples of cryoprotectants include sugars, such as sucrose, glucose, trehalose, mannitol, mannose, and lactose; polymers, such as dextran, hydroxyethyl starch and polyethylene glycol; surfactants, such as polysorbates (e.g., PS-20 or PS-80); and amino acids, such as glycine, arginine, leucine, and serine. A cryoprotectant exhibiting low toxicity in biological systems is generally used.

In some embodiments, the cells are formulated by first harvesting them from their culture medium, and then washing and concentrating the cells in a medium and container system suitable for administration (a "pharmaceutically acceptable" carrier) in a therapeutically effective amount. Suitable infusion medium can be any isotonic medium formulation, typically normal saline, Normosol R (Abbott) or Plasma-Lyte A (Baxter), but also 5% dextrose in water or Ringer's lactate can be utilized. The infusion medium can be supplemented with human serum albumin, fetal bovine serum or other human serum components.

In one aspect, the present invention provides a cell according to the present invention or a pharmaceutical composition according to the present invention for use as a medicament.

Methods of Treatment

In one aspect, the present invention provides a method of treating Multiple myeloma comprising administering the cell of the present invention or the pharmaceutical composition of the present invention to a patient in need thereof.

In some embodiments, the patient is administered a therapeutically effective amount of cells. In some embodiments, the patient is administered at least $10^2$, $10^3$, $10^4$, $10^5$, $10^6$, $10^7$, $10^8$, $10^9$ or $10^{10}$ cells. The number of cells will depend upon the ultimate use for which the composition is intended as will the type of cells included therein.

In some embodiments, the cell or pharmaceutical composition is administered intravenously, intraperitoneally, into the bone marrow, into the lymph node, and/or into cerebrospinal fluid.

In some embodiments, the method comprises a combination therapy. In some embodiments, the method comprises further administering an immune checkpoint inhibitor (see Lim & June, 2017. Cell. 168(4):724-740). In a further embodiment, the method comprises further administering an immune checkpoint inhibitor and/or an IAP inhibitor (see WO 2016/054555).

In some embodiments, the cell or pharmaceutical composition as described herein is administered in combination with chemotherapeutic agents and/or immunosuppressants. In an embodiment, a patient is first treated with a chemotherapeutic agent that inhibits or destroys other immune cells followed by the cell or pharmaceutical composition described herein. In some cases, chemotherapy may be avoided entirely.

The following examples serve to illustrate the present invention but they do not limit the same.

EXAMPLES

Material and Methods

Ethics Statement: research involving human materials was approved by Ethical Committee of Clinical Research (Hospital Clinic, Barcelona). Peripheral blood (PB) T cells were obtained from healthy donors who gave informed consent. All animal work was performed under the Ethical Committee of Animal Research (Hospital Clinic, Barcelona).

Cell cultures: RPMI8226, U266 and K562 were purchased from American Tissue Culture Collection (ATCC, Manassas, VA). ARP1 cell line was kindly provided by Multiple Myeloma Research Center (Little Rock, AK, USA). Cell lines (K562, RPMI8226 and ARP1) were cultured in RPMI with 10% Fetal Bovine Serum (FBS) and 1% Penicillin/streptomycin (Pen/Strep) and U266 with 15% FBS. 293-T cells were cultured with DMEM with 10% FBS and 1 Pen/Strep. Lymphocytes were obtained from healthy donors by Ficoll and Magnetic Depletion with T cell Isolation Kit (Miltenyi Biotec). T cells were expanded in Click's media (50% RPMI, 50% Click's mediums from Irvine Scientific and supplemented with 5% human Serum and 1% Pen/strep) and activated with Dynabeads Human T-Activator CD3/CD28 (Thermo Fisher Scientific) and IL-2 (100 IU) every other day. Experiments were performed after 8-10 days of T cell expansion. Macrophages were differentiated from monocytes after expansion with RPMI 10% FBS and 0.1 mg/ml M-CSF (Thermo Fisher Scientific) during 1 week.

Cloning and humanization: ARI2m transmembrane domain, co-stimulatory domain (4-1BB) and CD3ζ was obtained from a lentiviral vector which contained the CART19 used at our Institution (pCCL-EF1α-CD19-CD8a-41BB-CD3ζ). The scFv-CD19 was substituted for the scFv BCMA that was obtained from the anti-BCMA antibody J22.9, previously published by Oden F. et al and that was available free at NCBI-Protein Genbank. The full amino acid sequence corresponding to the signal peptide, VH, linker, VL, CD8 hinge, CD8 TM, 4-1BB and CD3ζ corresponding to the murine ARI2m is shown herein below:

```
MURINE (ARI2m) (SEQ ID NO 14):
MEAEPAQLLFLLLLWLPDTTGQVQLQQSGGGLVQPGGSLKLSCAASGIDF

SRYWMSWVRRAPGKGLEWIGEINPDSSTINYAPSLKDKFIISRDNAKNTL

YLQMSKVRSEDTALYYCASLYYDYGDAMDYWGQGTSVTVSSGGGGSGGGG

SGGGGSDIVMTQSQRFMTTSVGDRVSVTCKASQSVDSNVAWYQQKPRQSP

KALIFSASLRFSGVPARFTGSGSGTDFTLTISNLQSEDLAEYFCQQYNNY

PLTFGAGTKLELKTTTPAPRPPTPAPTIASQPLSLRPEACRPAAGGAVHT

RGLDFACDIYIWAPLAGTCGVLLLSLVITLYCKRGRKKLLYIFKQPFMRP

VQTTQEEDGCSCRFPEEEEGGCELRVKFSRSADAPAYQQGQNQLYNELNL

GRREEYDVLDKRRGRDPEMGGKPQRRKNPQEGLYNELQKDKMAEAYSEIG

MKGERRRGKGHDGLYQGLSTATKDTYDALHMQALPPR

Signal peptide (SEQ ID NO 5):
MEAPAQLLFLLLLWLPDTTG

VH (SEQ ID NO 15):
QVQLQQSGGGLVQPGGSLEISCAASGIDFSRYWMSWVRRAPGKGLEWIGE

INPDSSTINYAPSLKDKFIISRDNAKNTLYLQMSKVRSEDTALYYCASLY

YDYGDAMDYWGQGTSVTVSS

Linker (SEQ ID NO 4):
GGGGSGGGGSGGGGS

VL (SEQ ID NO 16):
DIVMTQSQRFMTTSVGDRVSVTCKASQSVDSNVAWYQQKPRQSPKALIFS

ASLRFSGVPARFTGSGSGTDFTLTISNLQSEDLAEYFCQQYNNYPLTGAG

TKLELK

CD8 hinge(SEQ ID NO 8):
TTTPAPRPPTPAPTIASQPLSLRPEACRPAAGGAVHTRGLDFACDI

CD8 TM (SEQ ID NO 7):
YIWAPLAGTCGVLLLSLVITLYC 4-1BB (SEQ ID NO 11):
KRGRKKLLYIFKQPFMRPVQTTQEEDGCSCRFPEEEEGGCEL

CD3ζ (SEQ ID NO 10):
RVKFSRSADAPAYQQGQNQLYNELNLGRREEYDVLDKRRGRDPEMGGKPQ

RRKNPQEGLYNELQKDKMAEAYSEIGMKGERRRGKGHDGLYQGLSTATKD

TYDALHMQALPPR
```

To obtain the ARI2h, the scFv of the ARI2m sequence was humanized using two predictive models (Blast and Germline) to substitute murine amino acids for their homologous in humans, excluding both the Complementarity-Determining Region (CDR) and the Vernier zone. Once, the sequence was ready it was cloned into pCCL vector using the same procedure as for ARI2m. The humanized sequence as well as the aminoacid sequence differences between the ARI2h and the ARI2m are shown herein below:

```
HUMANIZED (ARI2h (the Germline variant) which corresponds to SEQ ID NO 13):
MEAPAQLLFLLLLWLPDTTGEVQLVESGGGLVQPGGSLRLSCAASGIDFSRYWMSWVRQAPG

KGLEWIGEINPDSSTINYAPSLKDRFTISRDNAKNSLYLQMNSLRAEDTAVYYCASLYYDYG

DAMDYWGQGTLVTVSSGGGGSGGGGSGGGGSDIQMTQSPSSLSASVGDRVTITCKASQSVDS

NVAWYQQKPGKAPKALIFSASLRFSGVPSRFSGSGSGTDFTLTISSLQPEDFATYYCQQYNN

YPLTFGGGTKVEIKTTTPAPRPPTPAPTIASQPLSLRPEACRPAAGGAVHTRGLDFACDIYI
```

-continued

```
WAPLAGTCGVLLLSLVITLYCKRGRKKLLYIFKQPFMRPVQTTQEEDGCSCRFPEEEEGGCE

LRVKFSRSADAPAYQQGQNQLYNELNLGRREEYDVLDKRRGRDPEMGGKPQRRKNPQEGLYN

ELQKDKMAEAYSEIGMKGERRRGKGHDGLYQGLSTATKDTYDALHMQALPPR

VH (SEQ ID NO 1):
EVQLVESGGGLVQPGGSLRLSCAASGIDFSRYWMSWVRQAPGKGLEWIGEINPDSSTINYAPSLKDRF

TISRDNAKNSLYLQMNSLRAEDTAVYYCASLYYDYGDAMDYWGQGTLVTVSS

Linker (SEQ ID NO 4):
GGGGSGGGGSGGGGS

VL (SEQ ID NO 2):
DIQMTQSPSSLSASVGDRVTITCKASQSVDSNVAWYQQKPGKAPKALIFSASLRFSGVPSRFSGSGSG

TDFTLTISSLQPEDFATYYCQQYNNYPLTFGGGTKVEIK

CD8 hinge (SEQ ID NO 8):
TTTPAPRPPTPAPTIASQPLSLRPEACRPAAGGAVHTRGLDFACDI

CD8 TM (SEQ ID NO 7):
YIWAPLAGTCGVLLLSLVITLYC 4-1BB (SEQ ID NO 11):
KRGRKKLLYIFKQPFMRPVQTTQEEDGCSCRFPEEEEGGCEL

CD3Cζ(SEQ ID NO 10):
RVKFSRSADAPAYQQGQNQLYNELNLGRREEYDVLDKRRGRDPEMGGKPQRRKNPQEGLYNE

LQKDKMAEAYSEIGMKGERRRGKGHDGLYQGLSTATKDTYDALHMQALPPR

Aminoacid differences made during the humanization process
(comparison between ARI2m and ARI2h):

bold: CDR

Italics: Vernier Zone underlined: AA changed

VH
Murine (AR2m):
QVQLQQSGGGLVQPGGSLKLSCAASGIDFSRYWMSWVRRAPGKGLEWIGEINPDSSTINYAP

SLKDKFISRDNAKNTLYLQMSKVRSEDTALYYCASLYYDYGDAMDYWGQGTSVTVSS

Humanized (AR2h):
EVQLVESGGGLVQPGGSLRLSCAASGIDFSRYWMSWVRQAPGKGLEWIGEINPDSSTINYAP

SLKDRFTISRDNAKNSLYLQMNSLRAEDTAVYYCASLYYDYGDAMDYWGQGTLVTVSS

VL:
Murine (AR2m):
DIVMTQSQRFMTTSVGDRVSVTCKASQSVDSNVAWYQQKPRQSPKALIFSASLRFSGVPARF

TSGSGTDFTLTISNLQSEDLAEYFCQQYNNYPLTFGAGTKLELK

Humanized (AR2h):
DIQMTQSPSSLSASVGDRVTITCKASQSVDSNVAWYQQKPGKAPKALIFSASLRFSGVPSRF

SGSGSGTDFTLTISSLQPEDFATYYCQQYNNYPLTFGGGTKVEIK
```

Virus production and CAR expression: 293-T cells were transfected with lentiviral vectors (pCCL-EF1α-BCMA, pREV-REV, pMDLg/pRRE and pCMV-VSV-G) to produce lentiviral virus and after 48 hours supernatant was collected and concentrated with LentiX-Concentrator (Clontech, Takara) following the manufacturer's protocol. Concentrated lentivirus was kept at −80° C. until they were used. T cells from healthy donors were activated on day 0 with Dynabeads and transduced with concentrated lentivirus on day 2 adding Polybrene (Merck Millipore) and centrifuged at 2000 rpm during 1 hour.

Flow cytometry: For CAR-BCMA detection, cells were incubated with a recombinant BCMA-Fc protein (Enzo Life Sciences) and afterwards with a secondary antibody anti-human IgG FC conjugated to Brilliant Violet (BV)-421 (Biolegend). Antibodies used for staining of T cells and exhaustion were CD3-APC and CD8-PE (Becton Dickinson), PD1-APC, TIM3-APC and LAG3-APC (Thermo Fisher Scientific). Multiple myeloma cells were stained with CD138-BV421 (Becton Dickinson) and BCMA-APC (Biolegend). Flow cytometry analysis for all experiments was performed by using FlowJo software.

Proliferation assays: CAR-T cells were stained with CellTrace™ CFSE Cell Proliferation Kit (Invitrogen, Thermo Fisher Scientific) before being co-cultured under different conditions and cell lines for 96 hours. Proliferation was analyzed by Flow cytometry.

Cytokine production and sBCMA: IFN-γ, TNF-α, IL-6, IL-1β cytokines were quantified by ELISAs (ELISA MAX™ Deluxe Set, Biolegend) following manufacturer's protocol. Soluble BCMA was detected by ELISA (Human BCMA/TNFRSF17 DuoSet ELISA, R&D systems) following manufacturer's protocol.

Confocal microscopy: RPMI cell line was transduced with lentiviral particles to overexpress BCMA fused to green fluorescent protein (GFP) and then co-cultured with CART cells stained with CellTracker™ Blue CMAC Dye (Thermo Fisher Scientific). Moreover, BCMA was also detected by confocal fluorescence microscopy with monoclonal anti-TNRSF17 mouse antibody (Sigma-Aldrich) and secondary anti-mouse IgG Alexa 647 (Cell signaling Technologies). Images were acquired using a Leica SP5 microscope. 405, 488 and 633 lasers were used for excitation, doing Z-stack acquisition images and applying the corresponding filters. For time lapse in vivo images acquisitions were performed every 20 seconds.

Cytotoxicity: assays were performed in different effector:target ratios from 1:1 to 0.125:1 from 24 to 96h of co-culturing T cells and tumor cells modified with a lentiviral vector (pLV) to over-express GFP-firefly luciferase (GFP-ffLuc). Percentage of remaining live GFP+ tumor cells was studied by flow cytometry applying the formula: % of live cell=% of GFP+ cells at time x/% of GFP+ cells at 0 h).

In vivo myeloma murine model: 8-12 weeks old NOD/SCID IL-2Rcnull (NSG) mice were irradiated at 2 G at day −1 and at day 0 mice were inoculated with GFP-ffLuc-ARP-1 cells. Mice received either 1 or 1.5×106 of ARP1 cells/mice depending on being female or male mice, respectively. Tumor cells were allowed to proliferate during 6 to 14 days, and then either NT T cells or CART cells were inoculated in mice. Mice were subjected to weekly bioluminescence imaging (BLI). BLI was performed using a Hamamatsu color CDD camera (Hamamatsu Photonics Systems, Bridgewater, NJ) following a 100 μL IP injection of D-luciferin (20 mg/mL PBS). Signal quantitation was performed with ImageJ software.

Results

Design and Functional Characterization of a Murine CARTBCMA (ARI2m)

Design of ARI2m was based in our CART19 (ARI1) containing CD8a, 4-1BB and CD3ζ as hinge, transmembrane domain, co-stimulatory domain and signaling domain, respectively. The single chain variable fragment (scFv) codifying for anti-CD19 (A3B1 antibody) was exchanged for the sequence of the anti-BCMA antibody J22.9 21, which had been successfully tested against MM 22. This whole sequence was cloned into a 3rd generation pCCL lentiviral vector (FIG. 1A). CART cell transfection efficiencies were higher than 30% and varied between 30-60% in all our in vitro and in vivo experiments, which were retained after cryopreservation and thawing of CART cells (FIG. 1B). ARI2 efficacy against different MM cells lines (ARP1 and U266) was confirmed after co-culturing T cells and MM cells at an E:T ratio of 1:1 over four days, which demonstrated efficient elimination of MM cells in comparison to non-Transduced T cells (FIG. 1C). Moreover, K562 non-MM cells, which do not express BCMA, were not eliminated by ARI2m cells demonstrating specificity of ARI2m cells (FIG. 1C). In addition, limiting dilution cytotoxicity assays from 1:1 to 0.125:1 E:T ratios demonstrated the high efficacy of ARI2m cells by eliminating MM cells at 36 h (FIG. 1D) at a low E:T ratio which continued to increase at 72 h (FIG. 1E). As expected, no toxicity was detected against K562 cells (FIGS. 1D and 1E).

The production of pro-inflammatory cytokines by ARI2m cells was also analyzed at 24 and 48 h of co-culturing ARI2 cells and MM cells at different E:T ratios. A high IFNγ production was observed by ARI2m cells at 24 h which continued to increase at 48 h (FIG. 1F). Some IFNγ production was detected for non-transduced (NT) T cells as expected, as NT T cells are activated due to the in vitro expansion. Minimum levels of IL6 were also detected at 24 h and increasing at 48 h of co-culturing. Moreover, as expected, some IL6 secretion was observed for MM cells alone (FIG. 1F). TNFα production decreased at 48 h in comparison to 24 h demonstrating that TNFα is produced at early times of CART activation (FIG. 1F). Unfortunately IL1β production could not be detected in this in vitro system.

In vivo efficacy of ARI2m cells was analyzed in our murine model where NSG-mice received $1\times10^6$ of ARP1 MM cells, and were treated 6 days later either with $10\times10^6$ of NT cells or with $10\times10^6$ of T cells containing $2\times10^6$ of ARI2m cells (FIG. 1G). Disease progression followed by bioluminescence showed that ARI2m cells avoided disease progression in comparison to untreated mice and mice treated with NT T cells (FIG. 1H), which translated into a higher survival (FIG. 1I). Moreover, analysis of mice tissues at the end of the experiment showed absence of MM cells in the BM and the spleen (FIG. 1J); and that whereas T cells were found mainly in the spleen (FIG. 1K), CART cells proliferated mainly in the BM, as indicated by a higher percentage of CART cells from the whole T cell population in BM than in spleen (FIG. 1K), a finding highly relevant as MM is a disease of the BM. Moreover, as an additional marker for MM progression, we analyzed the amount of sBCMA in mice serum confirming a high amount of sBCMA in mice treated with NT T cells and total absence of sBCMA in mice treated with ARI2m cells (FIG. 1L).

Humanization of ARI2m into ARI2h and Comparison of ARI2m Vs ARI2h

Figure 2:
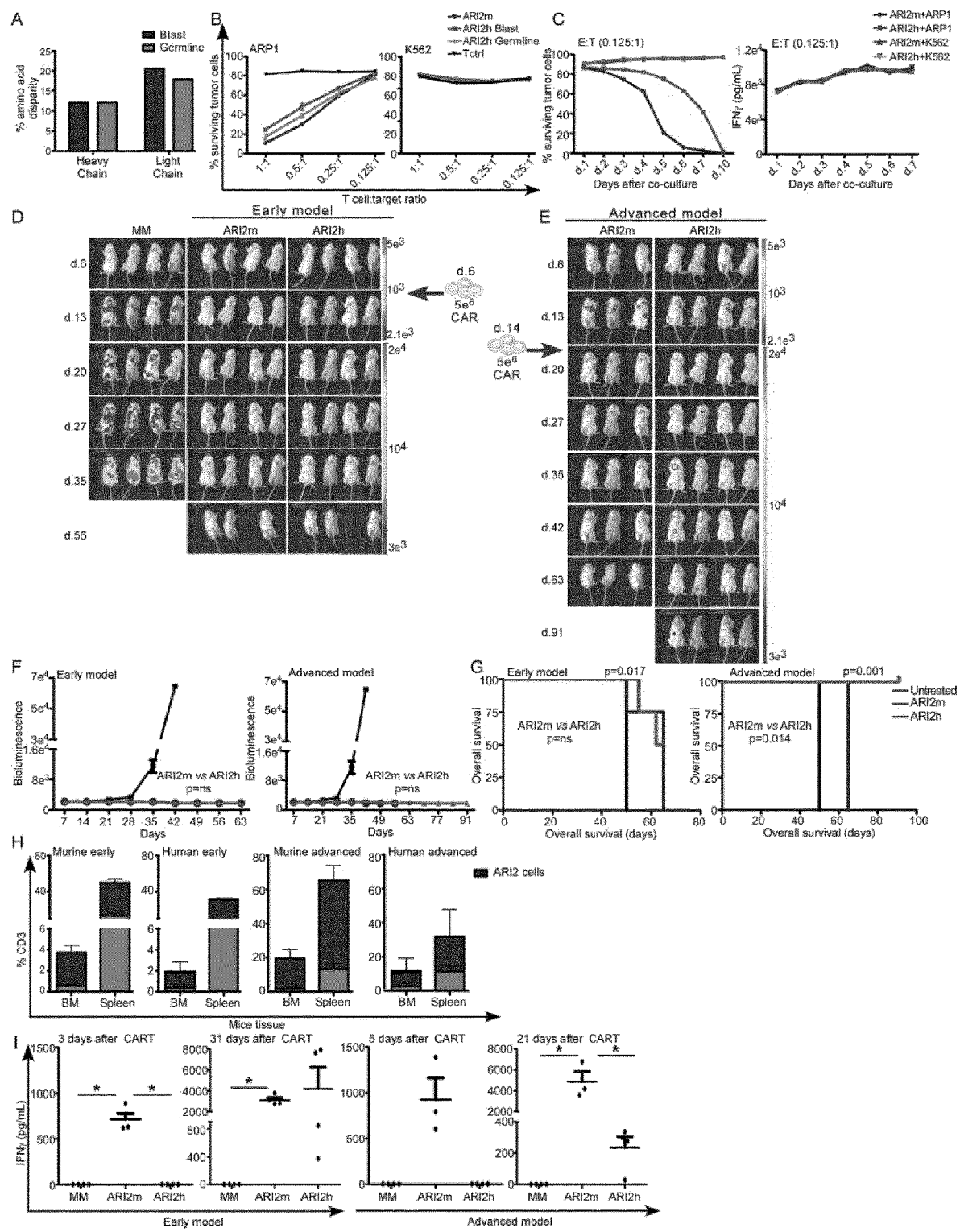
FIG. 2: Humanization of ARI2m into ARI2h and comparison of ARI2m vs ARI2h: (A) Schematic representation of amino acid disparity for heavy and light chain of scFv in humanized ARI2 based on BLAST or Germline algorithms. (B) Limiting dilution cytotoxicity assay of ARI2m vs both humanized versions (Blast and Germline). (C) Long-term cytotoxic assay comparing murine vs humanized ARI2 against ARP1 (MM) and K562 (CML) and its IFNγ production. (D-I) In vivo results: Disease progression by weekly bioluminescence in the early model (D) and advanced model (E) and its quantification respectively (F). (G) Kaplan-Meier curve representing the overall survival of untreated, ARI2m and ARI2h mice group in early and advanced disease models. (H) Total CD3+ T cells and percentage of ARI2 cells from CD3+ T cells population found in BM and Spleen for both early and advanced disease models. (I) ELISA of IFNγ from mice serum at day 3 and 31 for the early disease model and at day 5 and 21 for the advanced disease model.

Early disappearance of CART cells in patients, which can lead to non-durable responses, is associated to a xenorecognition by the human immune system against the murine component of the scFV in the CAR. Therefore, scFv humanization of ARI2m was performed. Two different variants of ARI2 (Blast and Germline) were created based on two different predictive algorithms by the substitution of murine amino acids (aa) to aa more frequently found in the human code. Whereas for the heavy chain, both variants showed the same number of substituted aa in comparison to the murine sequence, for the light chain, the Germline variant had a lower number of substituted aa than the Blast variant (FIG. 2A). In vitro comparison of the efficacy of both variants demonstrated a slightly higher anti-MM activity for the Germline variant (FIG. 2B) and specificity against MM cells for both variants, as none of them eliminated K562 cells (FIG. 2B). Therefore, Germ line variant was selected for all additional assays to compare ARI2m vs ARI2h (for the full sequences of both CARs please refer to the materials and methods). As a slightly lower in vitro efficacy of ARI2h vs ARI2m was noticed (FIG. 2B), a long-term cytotoxicity assay was performed co-culturing tumor and CART cells at a low E:T (0.125:1) ratio. This assay demonstrated that although ARI2h is slower than ARI2m, it accomplishes its aim by eliminating all MM cells (FIG. 2C). Moreover, a proliferation assay confirmed a slower proliferation rate for ARI2h cells. In addition, whereas the same IFNγ in vitro production was observed for both CARs in a long-term cytotoxicity assay (FIG. 2C), a lower TNFα and IL6 production for ARI2h vs ARI2m was demonstrated, suggesting a lower toxic profile for ARI2h.

ARI2h and ARI2m were compared in vivo in two different models of MM disease (early and advanced). Mice received MM cells on day 0 and were treated with $5 \times 10^6$ of CART cells either on day 6 or day 14 to create an early and advanced model of disease, respectively (FIGS. 2D and 2E). In the early disease model, both ARI2h and ARI2m avoided MM disease progression equally (FIGS. 2D and 2F). As expected, around day 50 mice started to show signs of xeno-graft vs host disease (GVHD), which was more severe in the ARI2m group and translated into a lower survival for this group (FIG. 2G). In the advanced disease model, whereas ARI2m did not allow any disease progression, some disease signal was detected in the ARI2h group at certain time points (FIG. 2E) but was not significant (FIG. 2F). Moreover, mice treated with ARI2h survived longer due to a much lower toxicity in comparison to ARI2m (FIG. 2G). Analysis of mice tissues showed again a higher homing of T cells in the spleen in comparison to the BM (FIG. 2H). In both models, T cell proliferation was higher for ARI2m than for ARI2h, which might explain the higher toxicity of ARI2m (FIG. 2H); and importantly, for both CARs, and in both models of disease, the majority of T cells in the BM were CART cells (FIG. 2H). Last, mice serum analysis showed that both CARs secreted high amounts of IFNγ. However, and in agreement with previous observations of a lower toxic profile for ARI2h, IFNγ production by ARI2h was slower than for ARI2m. Thus, in the early model, whereas at 3 days after CART infusion, IFNγ production could not be detected in the ARI2h group, at 31 days after CART infusion both ARI2m and ARI2h showed a high amount of IFNγ production (FIG. 2I). In the advanced model, the same pattern was observed, showing at 5 days of CART administration absence of IFNγ production with ARI2h, and at 21 days a high IFNγ production for both CARs although lower for ARI2h (FIG. 2I).

These results suggested a faster activity of ARI2m vs ARI2h, which makes it plausible that in cases of a high tumor burden, this shall lead to a faster CART cell exhaustion. Therefore, a third in vivo experiment with a lower CART cell dose ($3 \times 10^6$) was performed. In this case, imaging bioluminescence showed that disease was more advanced when mice received CART cells on day 14 in comparison to the previous advanced model. In this model, neither ARI2m nor ARI2h could avoid disease progression. However, ARI2h performed better than ARI2m showing a lower disease progression and suggesting that its slower activity could lead to a lower exhaustion of CART cells in cases of high tumor burden.

Figure 3:
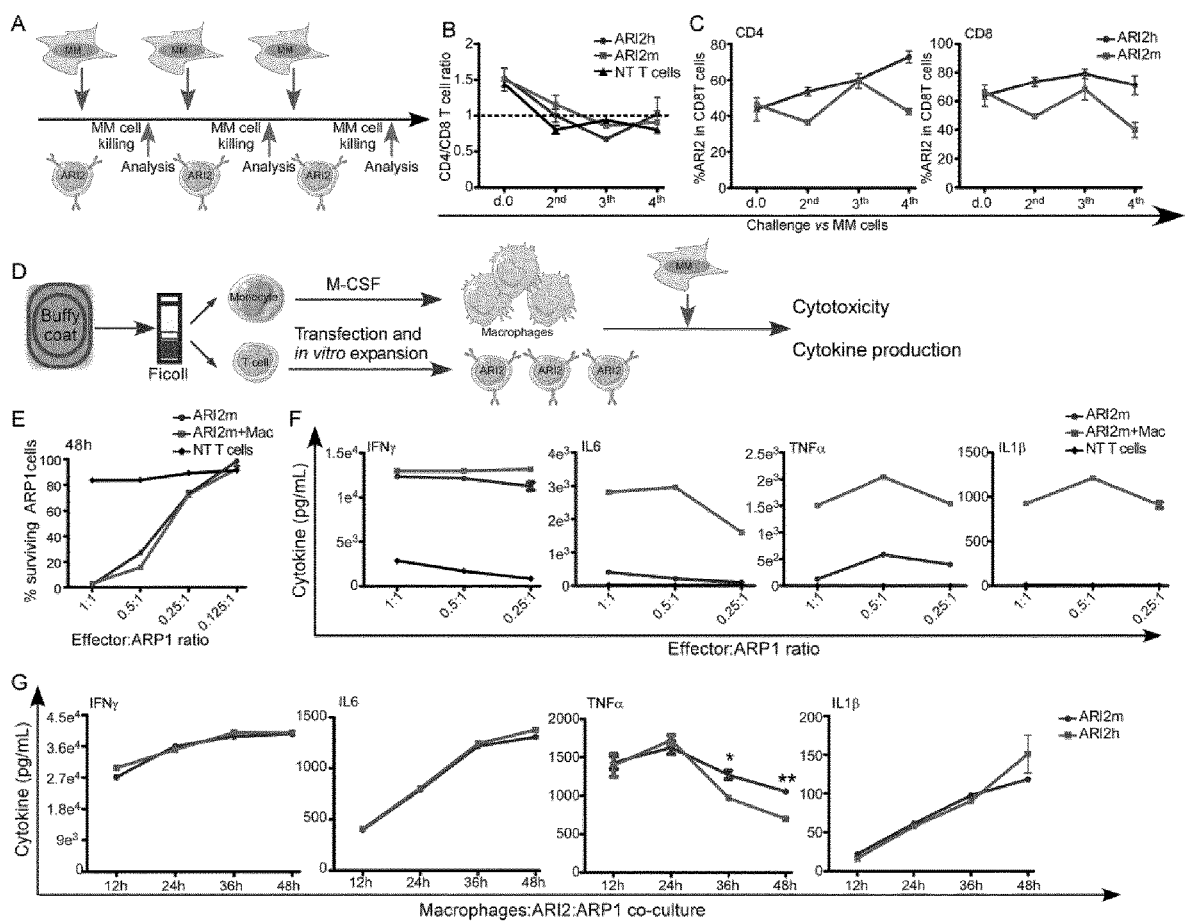
FIG. 3: T cell profile and inflammatory response of ARI2m vs ARI2h: (A) Schematic of repeat antigen stimulation assay. (B) CD4/CD8 T cell ratio profile of ARI2m, ARI2h and NT T cells along 4 consecutive challenges and percentage of CART cells in CD4 or CD8 T cell subsets (C). (D) Schematic representation of autologous monocytes and T cell isolation from the same buffy coat and its expansion, differentiation and co-culture with MM cell lines. (E) Cytotoxicity and production of pro-inflammatory cytokines (IL6, TNFα and IL1β) (F) of ARI2m against ARP1 cells with or without macrophages. (G) Cytokine production over 48 h of IFNγ, IL6, TNFα and IL1β after co-culturing ARI2m/ARI2h with macrophages and ARP1.

Response to Consecutive Challenges to Tumor Cells and Inflammatory Response of ARI2m Vs ARI2h Previous results showed that ARI2h had a slower in vivo activity which translated into a lower toxicity in terms of xeno-GVHD. Moreover, a high tumor burden decreased ARI2m efficacy, which we hypothesized, might be due to a faster exhaustion of ARI2m vs ARI2h. To confirm this hypothesis, we exposed CART cells to consecutive in vitro challenges with tumor cells (FIG. 3A). These experiments showed first, that T cell in vitro expansion achieved a higher number of CD4 T cells in comparison to CD8 T cells, a finding observed for both CART and NT T cells. However, exposure to tumor cells, led to a higher CD8 T cell proliferation, leading to a normalization of this CD4/CD8 ratio (FIG. 3B).

Moreover, consecutive challenges of CART cells to tumor cells demonstrated an increased CD4 and CD8-CART cell proliferation for ARI2h, whereas for ARI2m, this proliferation was not continuous (FIG. 3C), suggesting that after consecutive challenges to MM cells, ARI2m cells were either becoming exhausted or dying.

Moreover, we compared the pro-inflammatory profile of both CARs establishing a more similar model to the cytokine release syndrome (CRS) observed in patients, where macrophages, after being activated by CART cells, are the main producers of IL6, IL1β and TNFα. Therefore, monocytes and T cells isolated from the same individuals were differentiated to macrophages and to CART cells, respectively, and both were added into in vitro co-cultures with MM cells to evaluate cytotoxicity and cytokine production (FIG. 3E). Macrophages addition did not impact negatively the CART anti-MM activity (FIG. 3F), increased slightly IFNγ production (FIG. 3G), and a huge increase in IL6 and TNFα production was induced (FIG. 3G). Moreover, IL1β, which could not be detected in the absence of macrophages, was detected in high amounts after macrophages addition (FIG. 3G). Therefore, in this setting the pro-inflammatory activity of ARI2m and ARI2h was compared over two days, demonstrating a similar IFNγ, IL6 and IL1β production for both CARs (FIG. 3G) and a lower TNFα production for ARI2h (FIG. 3H) suggesting a lower pro-inflammatory and toxic activity for ARI2h, as previously indicated in the in vivo studies (FIG. 2D-2G).

Efficient Clinical Production and Activity of ARI2m and ARI2h

Figure 4:
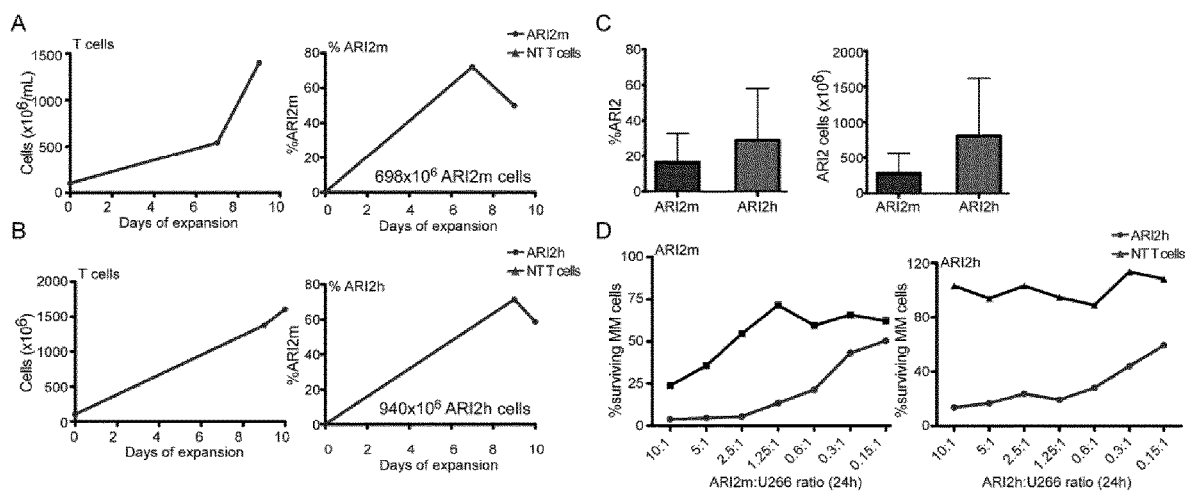
FIG. 4: Clinical production and activity of ARI2m and ARI2h: Clinical expansion of ARI2m and ARI2h cells (A and B) showing the total T cells achieved at the end of the expansion (left) and the percentage of CART cells achieved (right). (C) Median of four clinical expansions of ARI2m and ARI2h cells. Results show percentage and total number of ARI2 cells achieved at the end of the expansion. (D) Cytotoxicity assays against U266 MM cell line of both ARI2m and ARI2h cells at the end of the expansion.

These previous data supported the development of a Phase I Multicenter Clinical Trial for MM patients (EudraCT code: 2019-001472-11) that began in 2019 with ARI2 cells produced at our Institution and provided to all the centers participating. Therefore, ARI2m and ARI2h were expanded in the GMP facility at our Institution following the same protocol that is being used at our Institution for the Multicenter Phase II clinical trial in B cell malignancies with ARI1 cells 17. Both ARI2m (FIGS. 4A and 4C) and ARI2h (FIGS. 4B and 4C) were efficiently expanded achieving a higher number of CART cells than the minimum required ($>150 \times 10^6$ CART cells) to achieve responses in MM patients. Comparison of 4 clinical expansions showed that at the end of the expansion a comparable number of ARI2h and ARI2m cells was achieved, even though a higher percentage of ARI2h cells was obtained this difference was not significant, and probably was due to a higher virus titration for ARI2h (FIG. 4C). Moreover, these CART cells showed a high efficacy eliminating MM cells at low E:T ratios (FIG. 4D).

Soluble BCMA Impacts ARI2 Activity

Figure 5:
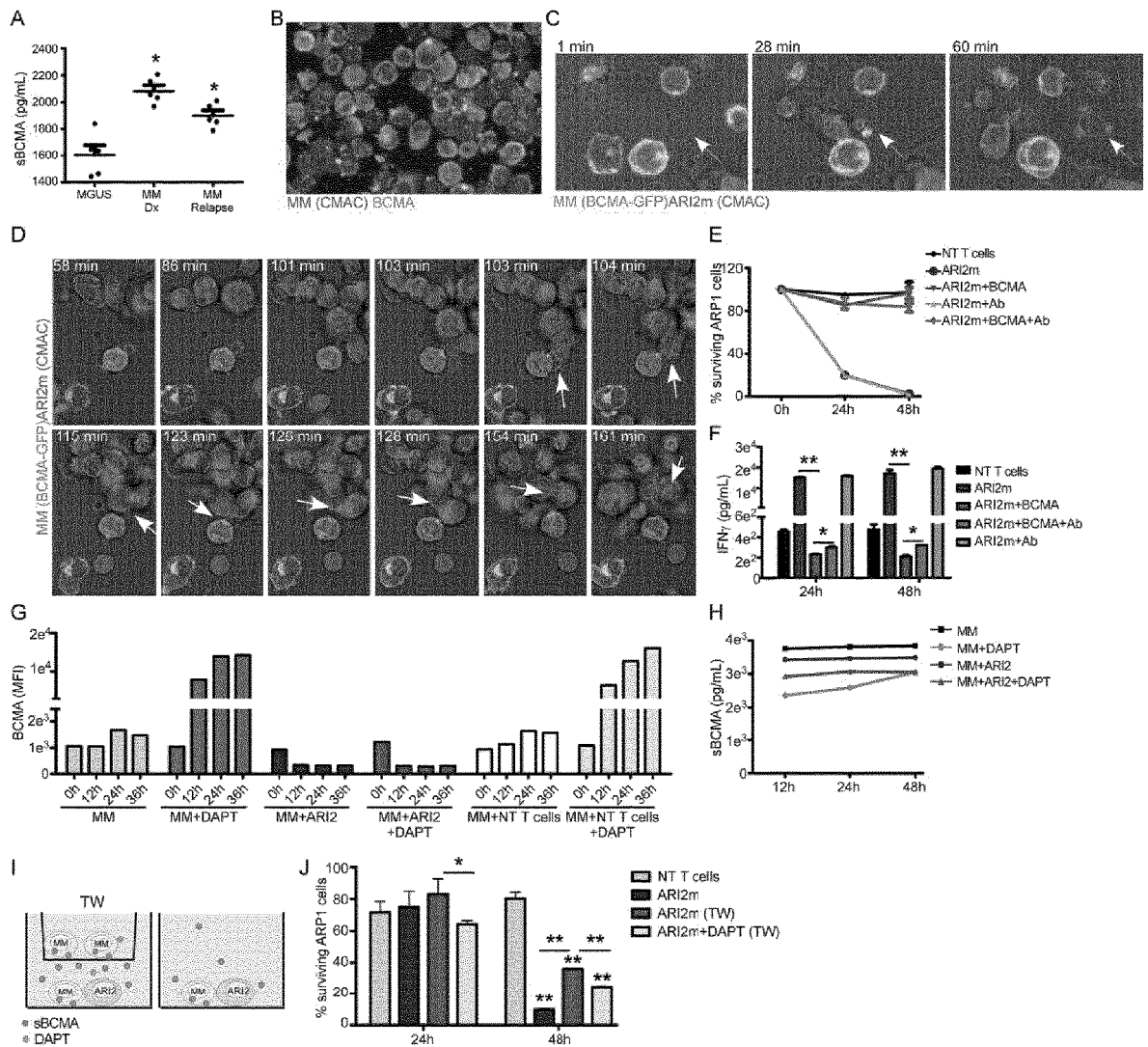
FIG. 5: Soluble BCMA impacts ARI2 activity: (A) ELISA of sBCMA from 5 patients with monoclonal gammopathy of undetermined significance (MGUS), MM at diagnosis (Dx) and at relapse. (B) Confocal fluorescence image where MM cells were stained with cell tracker CMAC and BCMA staining with a monoclonal anti-TNFRSF17. (C and D) Representative images from two different in vivo time lapse experiments over three hours of ARI2m stained with cell tracker CMAC and ARP1 MM cells over-expressing BCMA in GFP. (E) Cytotoxicity assay and IFNγ production (F) of ARI2m co-cultured with ARP1 MM cells, adding recombinant BCMA protein (BCMA) with and without an antibody against BCMA (Ab). (G) MFI of BCMA of ARP1 MM cell line alone or in co-culture with ARI2/NT T cells with or without DAPT and its sBCMA quantification (H). (I) Schematic of cytotoxic assays with and without a transwell (TW). Co-culture of ARI2m/NT T cells with ARP1 cell line is performed in the well, and additional ARP1 cells are added in the TW as a source for continuous releasing of sBCMA. DAPT was also added in parallel. (J) Cytotoxic results of experiment shown in (I).
Figure 6:
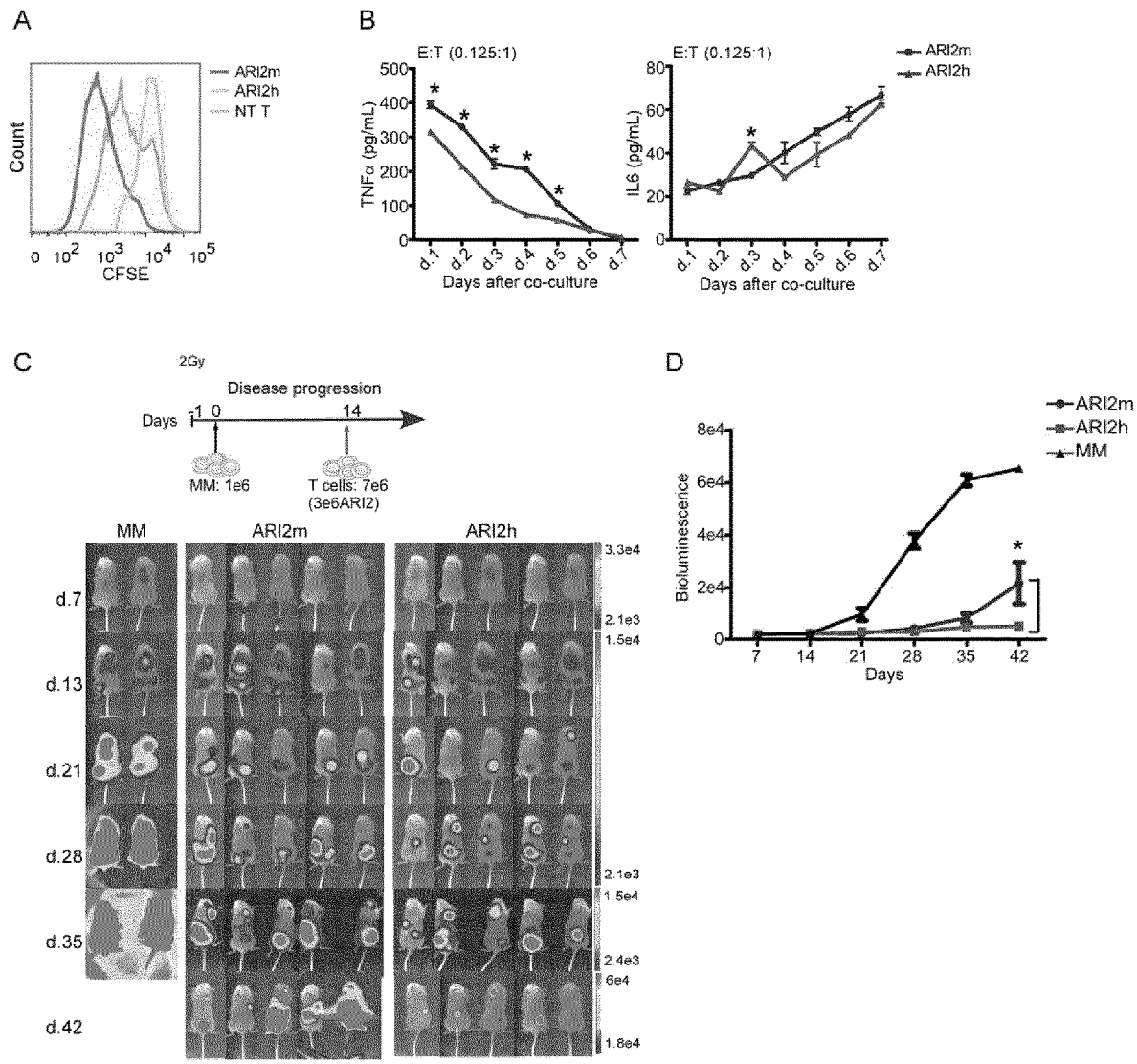
FIG. 6: Further comparison of ARI2m vs ARI2h in a very advanced disease model. (A) CFSE assay over 4 days to analyze ARI2 proliferation after encountering ARP1 MM cells. (B) TNFα and IL6 production over 7 days of co-culturing ARI2m and ARI2h cells with ARP1 MM cells at an 0.125:1 (E:T) ratio. (C) Schematic representation of in vivo experiment in mice receiving ARP1 MM cells and either ARI2m and ARI2h cells. (D) Disease progression followed by weekly bioluminescence of experiment in (C).

Clinical studies with CART19 in ALL have shown that a lower CART cell dose ($100 \times 10^6$) is required to achieve complete responses (CR) in comparison to studies in MM with CARTBCMA ($>150 \times 10^6$). In this regard, BCMA expression on the surface of MM cells is not stable, as it is continuously released as sBCMA to the extracellular milieu. Therefore, we hypothesized that sBCMA could bind to CARTBCMA cells inhibiting temporarily their activity, and explaining the high dose required in MM patients to achieve CR. Therefore, we first measured in patients with monoclonal gammopathy of undetermined significance (MGUS), in newly diagnosed MM patients and at relapse, the amount of sBCMA in serum, confirming a higher amount of sBCMA in MM patients (FIG. 5A). Moreover, confocal fluorescence microscopy confirmed that BCMA is released from MM cells in vesicles (FIG. 5B). Therefore, to confirm that sBCMA could impact temporarily CARTBCMA activity, MM cells over-expressing BCMA fused to GFP (MM-BCMA-GFP) were co-cultured with ARI2 cells for 3 hours performing in vivo time-lapse imaging. We confirmed that sBCMA released in vesicles bind to ARI2 cells entertaining ARI2 cells from their target MM cells (FIG. 5C). Moreover, we also observed that ARI2 cells after contacting MM cells could acquire in their membranes part of the BCMA from the sur-face of MM cells, and as a consequence, fratricide was observed between ARI2 cells (FIG. 5D).

To further confirm that sBCMA inhibits CART activity, MM cells were co-cultured with ARI2m cells in the presence of recombinant BCMA protein with and without an anti-BCMA antibody. Results confirmed that recombinant BCMA protein inhibits ARI2m activity in terms of cytotoxicity and IFNγ production (FIGS. 5E and 5F). The addition of an anti-BCMA restored partially this inhibition in terms only of IFNγ production and not cytotoxicity (FIGS. 5E and 5F). Moreover, sBCMA released from MM cells leads to a decreased BCMA expression in MM cells, an effect mediated by γ-secretase, which directly cleaves BCMA releasing soluble BCMA, and that can be avoided with the use of γ-secretase inhibitors. Therefore, we first analyzed the impact of a γ-secretase inhibitor (DAPT) in the BCMA expression on MM cells and in the amount of released sBCMA. As expected, DAPT treatment increased BCMA expression in MM cells and decreased the release of sBCMA (FIGS. 5G and 5H). This increased BCMA expression associated to DAPT was also detected after co-culturing MM cells with NT T cells (FIG. 5G). DAPT addition to ARI2/MM cells co-cultures decreased also the amount of sBCMA. However, the impact in BCMA expression was hardly detected in normal in vitro co-cultures due to the high ARI2 in vitro activity eliminating MM cells (FIGS. 5G and 5H). To confirm a possible role of DAPT enhancing ARI2 activity by decreasing the amount of sBCMA, we analyzed its impact in an in vitro setting with a continuous release of sBCMA by MM cells untouched by ARI2 cells. Therefore, we performed the same in vitro experiments in parallel in transwell plates, where MM cells untouched by ARI2 cells could release continuously sBCMA (FIG. 5I). In this setting, it was confirmed that the continuous release of sBCMA by untouched MM cells decreased ARI2 activity (FIG. 5J), and that DAPT addition avoided partially the negative impact of sBCMA released by untouched MM cells (FIG. 5J).

The invention claimed is:

1. A chimeric antigen receptor (CAR) comprising an extracellular domain comprising a BCMA targeting-moiety, a transmembrane domain, and an intracellular signaling domain, wherein the BCMA-targeting moiety comprises a VH domain and a VL domain, wherein said VH domain and VL domain consist, respectively, of SEQ ID NO: 1 and SEQ ID NO: 2.

2. The chimeric antigen receptor of claim 1, wherein the BCMA-targeting moiety comprises SEQ ID NO: 3.

3. A chimeric antigen receptor (CAR) comprising an extracellular domain comprising a BCMA targeting-moiety, a transmembrane domain, and an intracellular signaling domain, wherein the BCMA-targeting moiety is a single-chain variable fragment, comprising a VL domain and a VH domain, wherein said VH and VL domains respectively comprise SEQ ID NO: 1 and SEQ ID NO: 2.

4. The chimeric antigen receptor of claim 3, wherein the chimeric antigen receptor comprises:
   a. the single-chain variable fragment, comprising a VL domain and a VH domain, wherein said VH and VL domains respectively comprise SEQ ID NO: 1 and SEQ ID NO: 2;
   b. the transmembrane domain bound to a Hinge domain comprising SEQ ID NO: 9;
   c. a costimulatory signaling domain comprising SEQ ID NO: 11; and
   d. the intracellular signaling domain comprising SEQ ID NO: 10.

5. The chimeric antigen receptor (CAR) of claim 4, wherein the CAR consists of SEQ ID NO: 13.

6. A nucleic acid encoding the chimeric antigen receptor according to claim 3.

7. A cell comprising the nucleic acid according to claim 6.

8. The cell according to claim 7, wherein the cell is a T-cell.

9. A nucleic acid encoding the chimeric antigen receptor according to claim 1.

10. A cell comprising the nucleic acid according to claim 9.

11. The cell according to claim 10, wherein the cell is a T-cell.

12. A pharmaceutical composition comprising a plurality of cells according to claim 10 and a pharmaceutically acceptable carrier or diluent.

13. A method of treating multiple myeloma, wherein the method comprises administering the cell of claim 10, or a pharmaceutical composition comprising the cell, to a patient in need thereof.

14. The method of claim 13, wherein the cell is a T-cell.

15. An immunoglobulin binding protein comprising a BCMA targeting-moiety, wherein the BCMA-targeting moiety comprises a VH domain and a VL domain, wherein said VH domain and VL domain consist, respectively, of SEQ ID NO: 1 and SEQ ID NO: 2.

16. The immunoglobulin binding protein of claim 15, wherein the BCMA-targeting moiety comprises SEQ ID NO: 3.

17. The immunoglobulin binding protein of claim 15, wherein the BCMA-targeting moiety is an antibody, a single-chain variable fragment, an antigen-binding fragment, a single-chain antigen-binding fragment, or a single-chain fusion protein.

* * * * *